(12) United States Patent
Kline et al.

(10) Patent No.: US 10,194,582 B2
(45) Date of Patent: Feb. 5, 2019

(54) METHODS AND APPARATUS FOR APPLYING PRODUCT

(71) Applicant: Turfco Manufacturing, Inc., Blaine, MN (US)

(72) Inventors: David A. Kline, Mahtomedi, MN (US); Loren F. Hansen, Lincoln, NE (US); Robert C. Brophy, Raymond, NE (US)

(73) Assignee: Turfco Manufacturing, Inc., Blaine, MN (US)

( * ) Notice: Subject to any disclaimer, the term of this patent is extended or adjusted under 35 U.S.C. 154(b) by 0 days.

(21) Appl. No.: 15/137,052

(22) Filed: Apr. 25, 2016

(65) Prior Publication Data

US 2016/0234999 A1 Aug. 18, 2016

Related U.S. Application Data

(62) Division of application No. 14/158,891, filed on Jan. 20, 2014, now Pat. No. 9,321,075, which is a division
(Continued)

(51) Int. Cl.
*B05B 9/00* (2006.01)
*A01C 23/04* (2006.01)
(Continued)

(52) U.S. Cl.
CPC .......... *A01C 23/047* (2013.01); *A01C 17/005* (2013.01); *A01C 17/006* (2013.01);
(Continued)

(58) Field of Classification Search
CPC ..... B05B 7/0093; B05B 13/005; B05B 15/06; B05B 1/04; B05B 15/04; B05B 19/06;
(Continued)

(56) References Cited

U.S. PATENT DOCUMENTS 1,986,134 A 1/1935 Burrows et al.
2,242,453 A 5/1941 Cochran
(Continued)

OTHER PUBLICATIONS

Spyker The Spreader People, brochure for model: 288 Thunderbird ©, 2006, Spyker Spreaders, front page, pp. 4-9 and rear cover.

*Primary Examiner* — Davis Hwu
(74) *Attorney, Agent, or Firm* — Alan D. Kamrath; Kamrath IP Lawfirm, P.A.

(57) ABSTRACT

An apparatus applies product and includes a pivotal platform solely supported through bushings formed of compressible material. The ground speed can be locked by stepping on a step pivoting a composite block to engage with an engagement of the transmission proportioner arm. A gate is opened utilizing a control lever pivotally mounted to a pivotably mounted control block to either engage or avoid a tang of an adjustment guide. A drive belt system includes a variator having first and second sheaves having variable effective diameters when their pivot pin is moved by pivoting a lever. A spray tip sprays a fan style spray at a small acute angle to the application area. A flip shield is pivoted about an axis parallel to the movement direction and includes a linear straight portion parallel to the axis in a redirection position.

3 Claims, 22 Drawing Sheets

Related U.S. Application Data of application No. 13/295,539, filed on Nov. 14, 2011, now Pat. No. 8,632,018, which is a division of application No. 12/350,031, filed on Jan. 7, 2009, now Pat. No. 8,056,828.

(60) Provisional application No. 61/019,400, filed on Jan. 7, 2008.

(51) Int. Cl.
  *A01C 17/00* (2006.01)
  *B05B 1/04* (2006.01)
  *B05C 19/06* (2006.01)
  *G05G 11/00* (2006.01)
  *A01C 21/00* (2006.01)

(52) U.S. Cl.
  CPC .............. *A01C 21/00* (2013.01); *B05B 1/04* (2013.01); *B05C 19/06* (2013.01); *G05G 11/00* (2013.01); *Y10T 74/2022* (2015.01); *Y10T 403/32254* (2015.01)

(58) Field of Classification Search
  CPC ... A01C 17/005; A01C 23/001; A01C 17/008; A01C 23/047; A01C 17/006; A01C 21/00; G05G 11/00; Y10T 74/2022; Y10T 403/32254
  USPC .................................... 239/147, 172, 650, 1
  See application file for complete search history.

(56) References Cited

U.S. PATENT DOCUMENTS

| | | | |
|---|---|---|---|
| 2,580,145 A | 12/1951 | White | 299/30 |
| 2,883,115 A | 4/1959 | Converse | 239/172 |
| 2,927,667 A | 3/1960 | Herrmann | |
| 2,955,835 A | 10/1960 | Chouinard | |
| 3,232,626 A | 2/1966 | Polzin | |
| 3,313,174 A | 4/1967 | Walker et al. | |
| 3,485,314 A | 12/1969 | Herr | |
| 3,586,246 A | 6/1971 | Van Der Lely | 239/665 |
| 3,792,814 A | 2/1974 | Platz | 239/149 |
| 3,898,891 A | 8/1975 | Colloton | 74/474 |
| 3,913,837 A | 10/1975 | Grant | 239/198 |
| 3,987,964 A | 10/1976 | Pittman et al. | 239/169 |
| 4,083,495 A | 4/1978 | Sharp | 239/287 |
| 4,271,617 A | 6/1981 | Yoshizawa | 37/195 |
| 4,352,463 A | 10/1982 | Baker | 239/663 |
| 4,538,695 A | 9/1985 | Bradt | |
| 4,620,575 A | 11/1986 | Cuba et al. | 180/307 |
| 4,681,265 A | 7/1987 | Brabb et al. | |
| 4,716,980 A | 1/1988 | Butler | 180/19.2 |
| 4,867,381 A | 9/1989 | Speicher | 239/665 |
| 4,878,339 A | 11/1989 | Marier et al. | 56/14.7 |
| 5,199,196 A | 4/1993 | Straley | 37/442 |
| 5,653,466 A | 8/1997 | Berrios | 280/760 |
| 5,697,623 A | 12/1997 | Bermes et al. | 280/32.7 |
| 5,809,756 A | 9/1998 | Scag et al. | 56/10.8 |
| 5,810,371 A | 9/1998 | Velke | 280/32.7 |
| 5,860,604 A | 1/1999 | Kooiker | 239/684 |
| 5,882,020 A | 3/1999 | Velke | 280/32.7 |
| 5,890,867 A | 4/1999 | Hagemeyer | 414/519 |
| 5,927,730 A | 7/1999 | Sattler | 280/47.131 |
| 6,000,705 A | 12/1999 | Velke | 280/32.7 |
| 6,138,927 A | 10/2000 | Spear et al. | 239/666 |
| 6,202,779 B1 | 3/2001 | Musat | 180/170 |
| 6,234,495 B1 | 5/2001 | Velke | 280/32.7 |
| 6,443,252 B1 | 9/2002 | Andes | 180/65.1 |
| 6,490,849 B1 | 12/2002 | Scag et al. | 56/16.7 |
| 6,516,596 B2 | 2/2003 | Velke et al. | 56/14.7 |
| 6,550,563 B2 | 4/2003 | Velke et al. | 180/333 |
| 6,616,074 B2 | 9/2003 | Courtney et al. | |
| 6,793,154 B2 | 9/2004 | Kost | 239/288.5 |
| 6,845,829 B2 | 1/2005 | Hafendorfer | 180/6.48 |
| 6,908,052 B1 | 6/2005 | Jacobson | 239/722 |
| 7,306,175 B1 | 12/2007 | Farmer | 239/666 |
| 7,364,169 B2 | 4/2008 | Velke et al. | 280/32.7 |
| 7,540,436 B2 | 6/2009 | Truan et al. | 239/661 |
| 8,056,828 B1 * | 11/2011 | Kline | A01C 17/005 239/147 |
| 2004/0262434 A1 | 12/2004 | Buckner | 239/754 |
| 2006/0118652 A1 | 6/2006 | Hickenbottom et al. | 239/146 |
| 2008/0196374 A1 | 8/2008 | Gamble et al. | 56/14.7 |
| 2014/0131465 A1 | 5/2014 | Kline et al. | |

\* cited by examiner

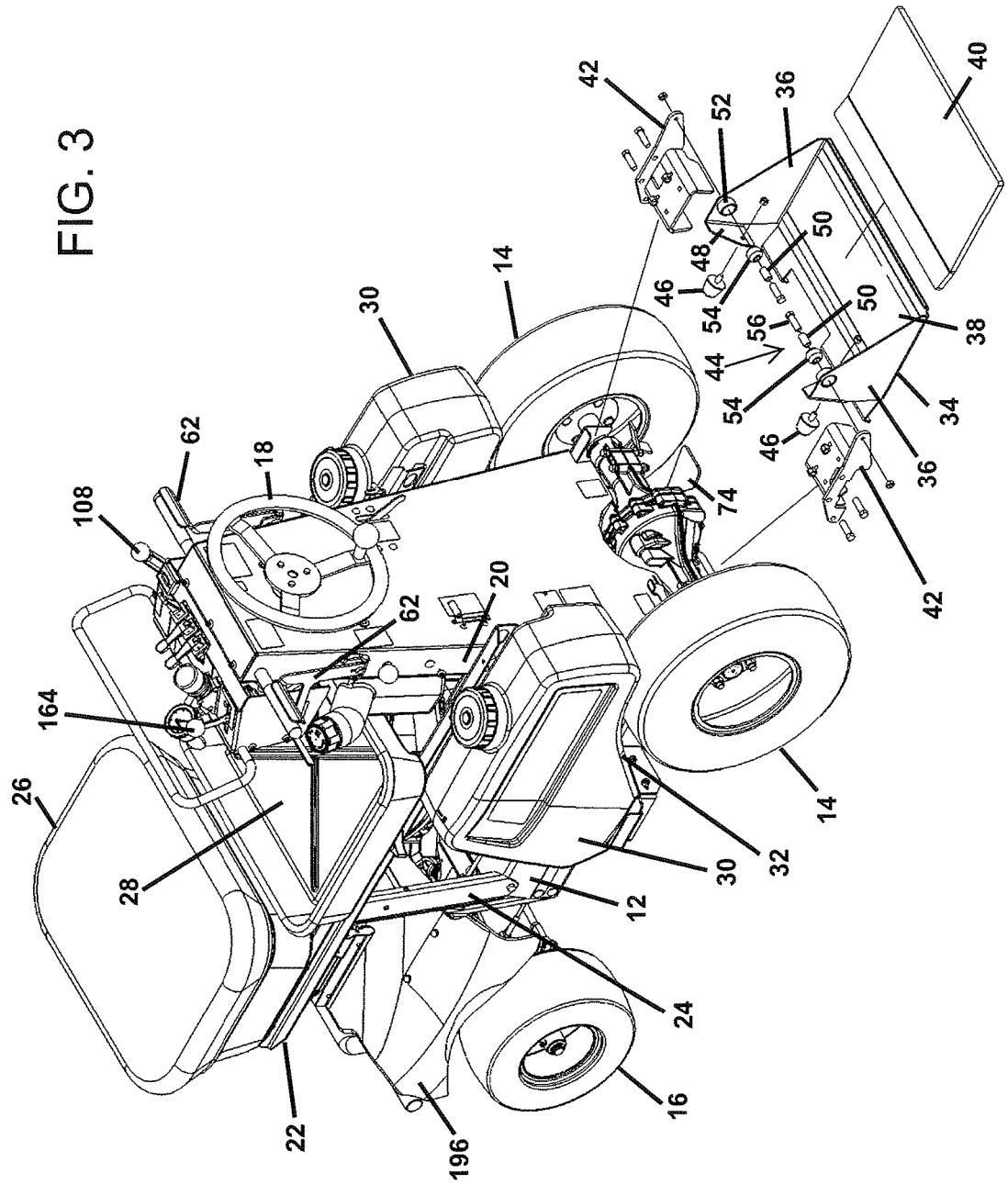

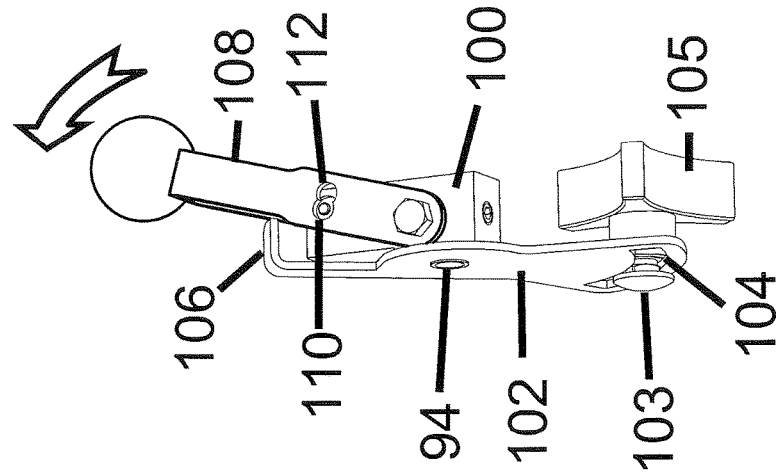
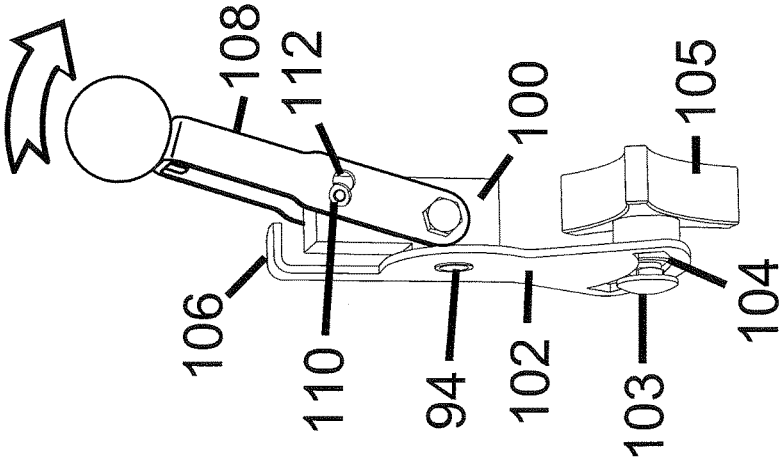
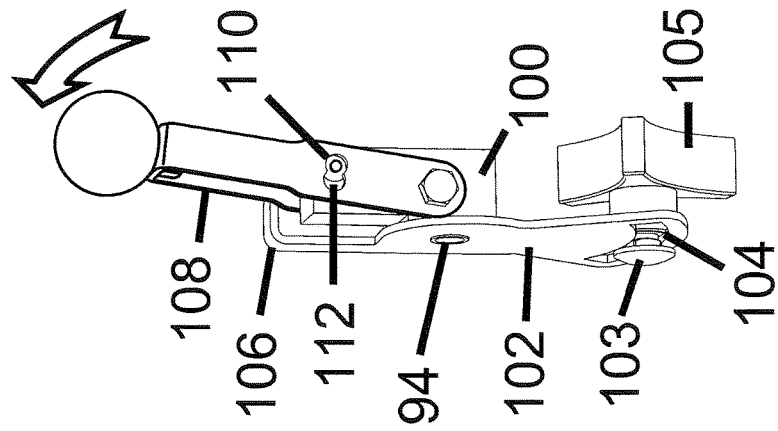

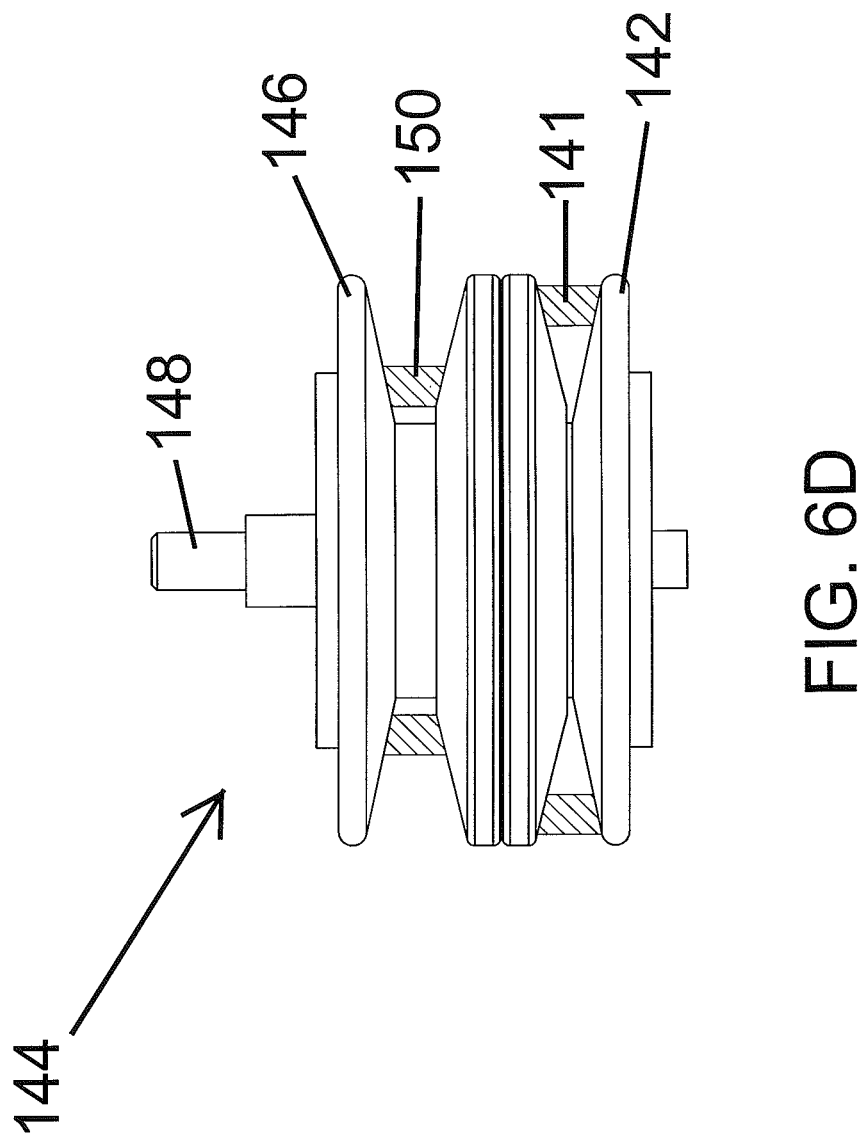

METHODS AND APPARATUS FOR APPLYING PRODUCT

CROSS REFERENCE

The present invention claims benefit of U.S. Provisional Application No. 61/019,400 filed Jan. 7, 2008.

BACKGROUND

The present invention generally relates to methods and apparatus for applying product to areas and, in particular, applying product in either liquid or granular form or both.

In turf management of golf courses, lawns, parks, or the like, it is necessary to periodically apply product in granular form or in liquid form such as fertilizer, insecticide, herbicide and the like. Similarly, it is desirable to apply product to other types of application areas such as salt to roadways, parking lots, driveways, or the like. Conventionally, product could be applied in manual manners. However, various forms of mechanized applicators have been developed especially for applying products to larger application areas. Such applicators utilize vehicular forms where the operator sits on or walked behind the applicator. However, such prior applicators had various deficiencies. As an example, it is often necessary for such applicators to traverse rough terrain in the application area and/or in moving to the application area including, but not limited to, traversing cement curbs extending along roads, driveways, or the like, with operators which are carried by prior applicators often being jolted or otherwise subjected to bumps or the like. Similarly, application areas often include portions such as sidewalks where it is not desired or economical to apply product, with prior applicators not having the ability to differentially apply product to the application area and/or including complicated controls to differentially apply product to the application area. Due to the size of application areas, it is often necessary for the operator to make multiple passes requiring product application to be stopped at the ends when turning to prevent excessive application at overlapping application areas. Thus, it is often necessary for the operator to stop and start the applicator multiple times and at desired times and often while simultaneously turning or performing other operations. Control of prior applicators was difficult to perform and often resulted in application errors and/or required that movement of the applicator on the application area to be stopped to allow adjustment operations. In addition to application errors, prior applicators resulted in operator fatigue, discomfort or the like.

Thus, a need has arisen for methods and apparatus for applying product in either liquid or granular form and which overcomes the deficiencies of prior applicators and which are otherwise advantageous.

SUMMARY

The present invention solves this need and other problems in the field of applying product in either liquid or granular form to application areas by providing, in most preferred aspects, apparatus and methods for applying product which could be in liquid or granular form upon an area.

In preferred aspects of the present invention, the operator is supported by a device including first and second bushings pivotally mounting first and second sides of a platform to a vehicular portion of the apparatus about an axis extending parallel to a support of the platform. The bushings are each formed of compressible material, with the platform solely supported by the vehicular portion through the bushings. In a most preferred form, the platform is pivotally mounted between the operable position and a transport position.

In other aspects of the present invention, a ground speed lock includes a step pivotally mounted and biased from a locked position to an unlocked position. A composite block is moveably related to the step and engages with an engagement connected to and moveable with the proportioner arm of the apparatus for preventing relative movement of the composite block and the engagement.

In still other aspects of the present invention, the gate control includes a control lever pivotally mounted to a control block about an axis generally perpendicular to a pivot pin rotatably mounting the control block. The control lever is pivotal between a bumping position abutting with a tang of an adjustment guide, with the tang not interfering with the control lever in an angled position in the rotatable path.

In still other aspects of the present invention, a variator includes first and second sheaves rotatable about a pivot pin moveable to change the effective diameters of the first and second sheaves. A first belt is connected between the drive pulley and the first sheave, and a second belt is connected between the spinner pulley and the second sheave. A flexible cable is operationally connected to a control lever and the pivot pin and moves the pivot pin when pivoted.

In additional aspects of the present invention, a spray tip is carried by the frame assembly at a small acute angle to the area spraying product in liquid form in a fan style spray having an increasing width in the movement direction and parallel to the areas and with a height perpendicular to the areas which is an amount insignificant to the width when the spray engages the areas.

In even further aspects of the present invention, a flip shield is pivotally mounted relative to the frame assembly and to a primary shield about a pivot axis parallel to the movement direction and generally perpendicular to a vertical axis of a spinner, with the primary shield being concentric to and spaced from the spinner. The flip shield is pivotal between an inoperative position not operatively interfering with product leaving the spinner and a redirection position abutting with the primary shield and where a linear straight portion extends parallel to the movement direction and the pivot axis and extending parallel to a tangent to the outer circumference of the spinner.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 3 shows an exploded, rear perspective view of the product applying apparatus of FIG. 1.

FIGS. 5A-5D show partial perspective views of the product applying apparatus of FIG. 1 with the hopper gate control in differing positions.

FIGS. 6A-6D show top and partial side views of the product applying apparatus of FIG. 1, with the spinner drive system in differing positions.

Figure 1:
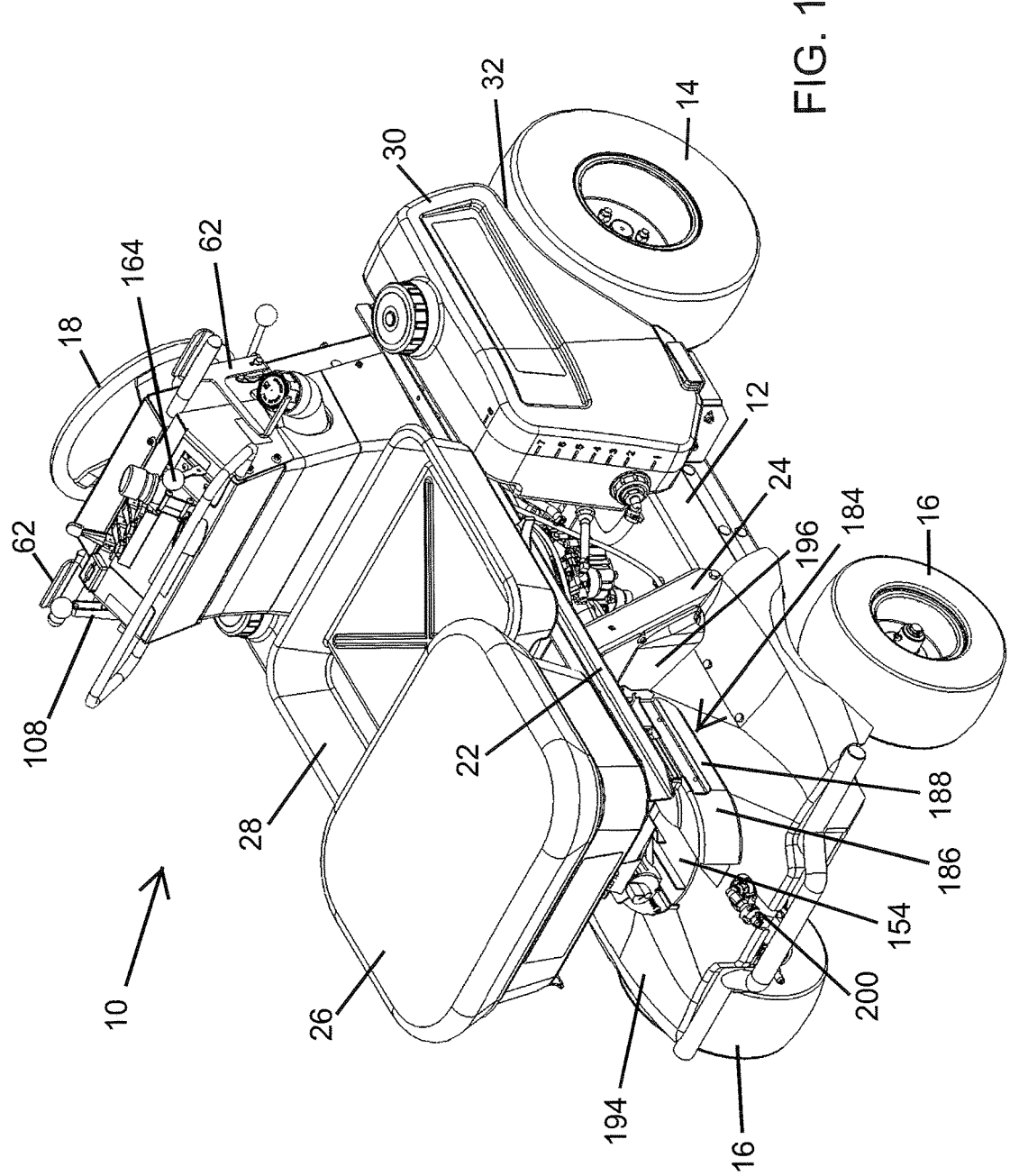
FIG. 1 shows a front perspective view of a product applying apparatus according to the preferred teachings of the present invention.
Figure 2:
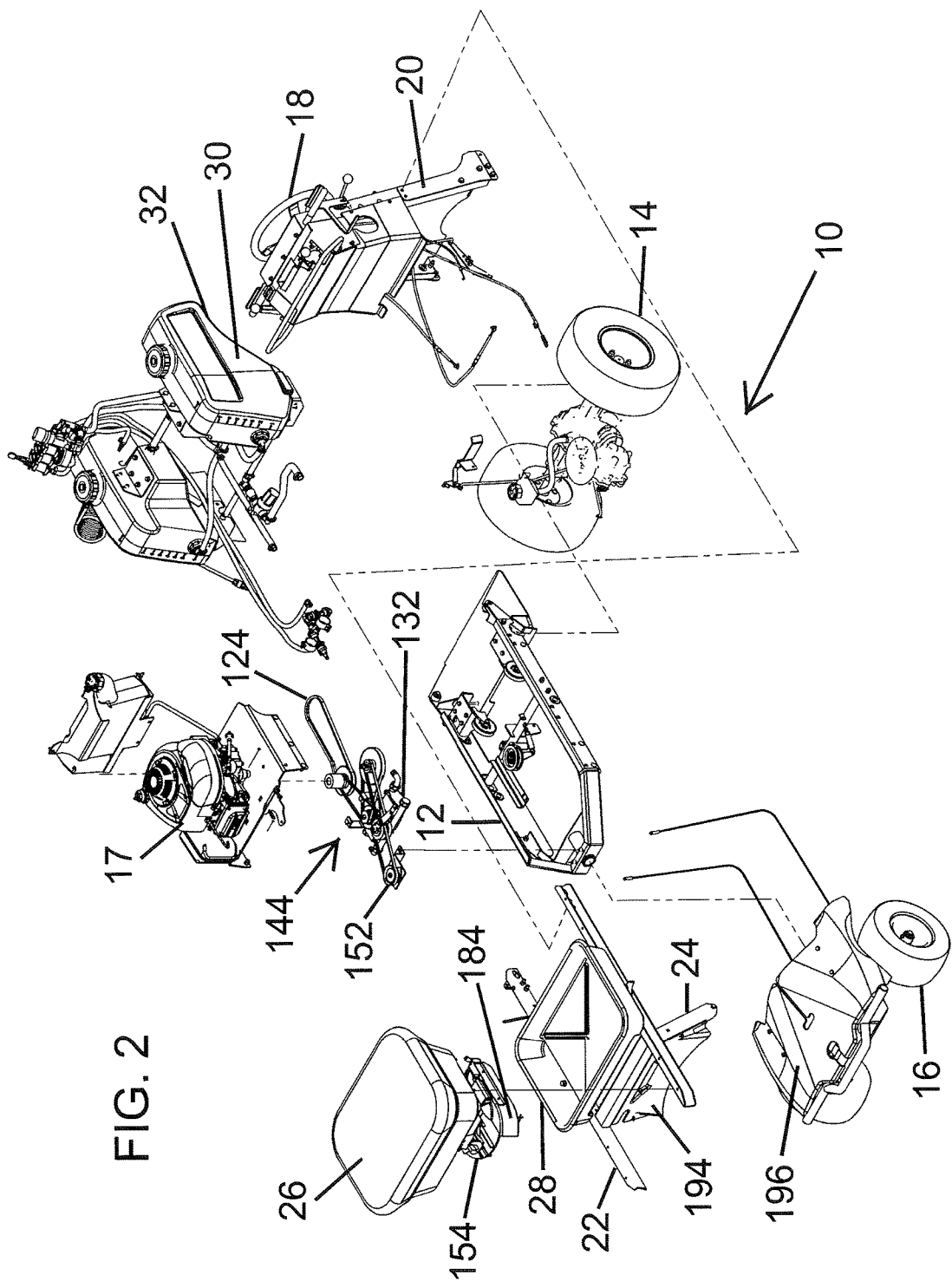
FIG. 2 shows an exploded perspective view of the product applying apparatus of FIG. 1.
Figure 3A:
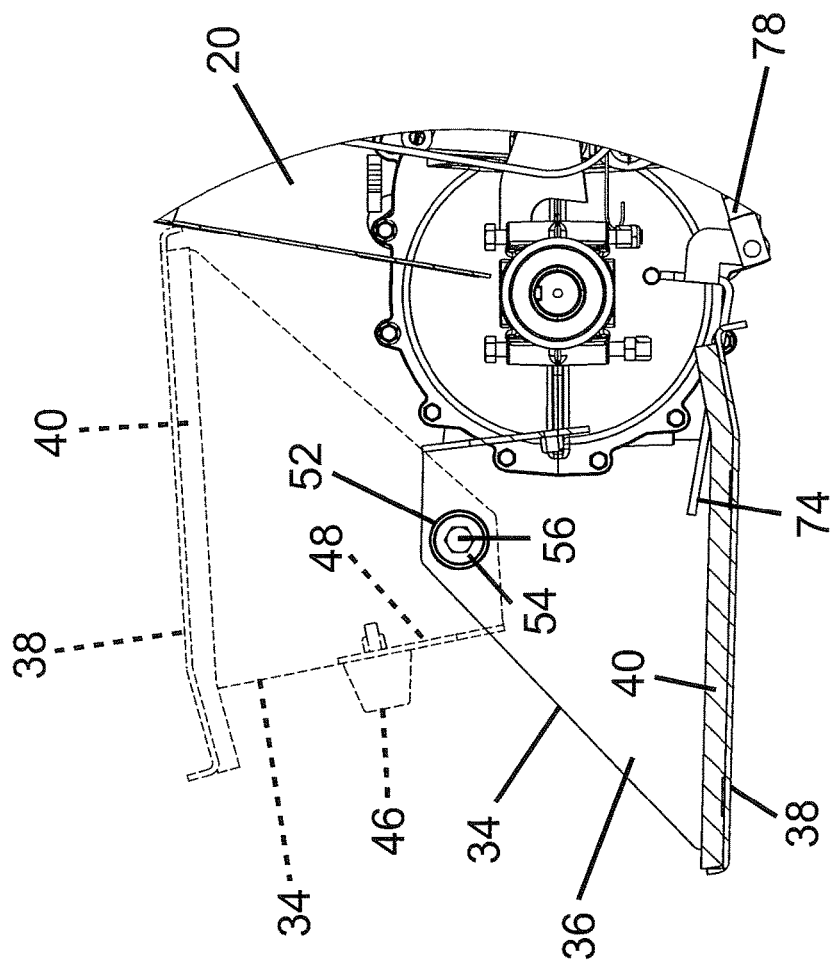
FIG. 3A shows a cross sectional view of the product applying apparatus of FIG. 1, with the platform in a different position shown in phantom.
Figure 4:
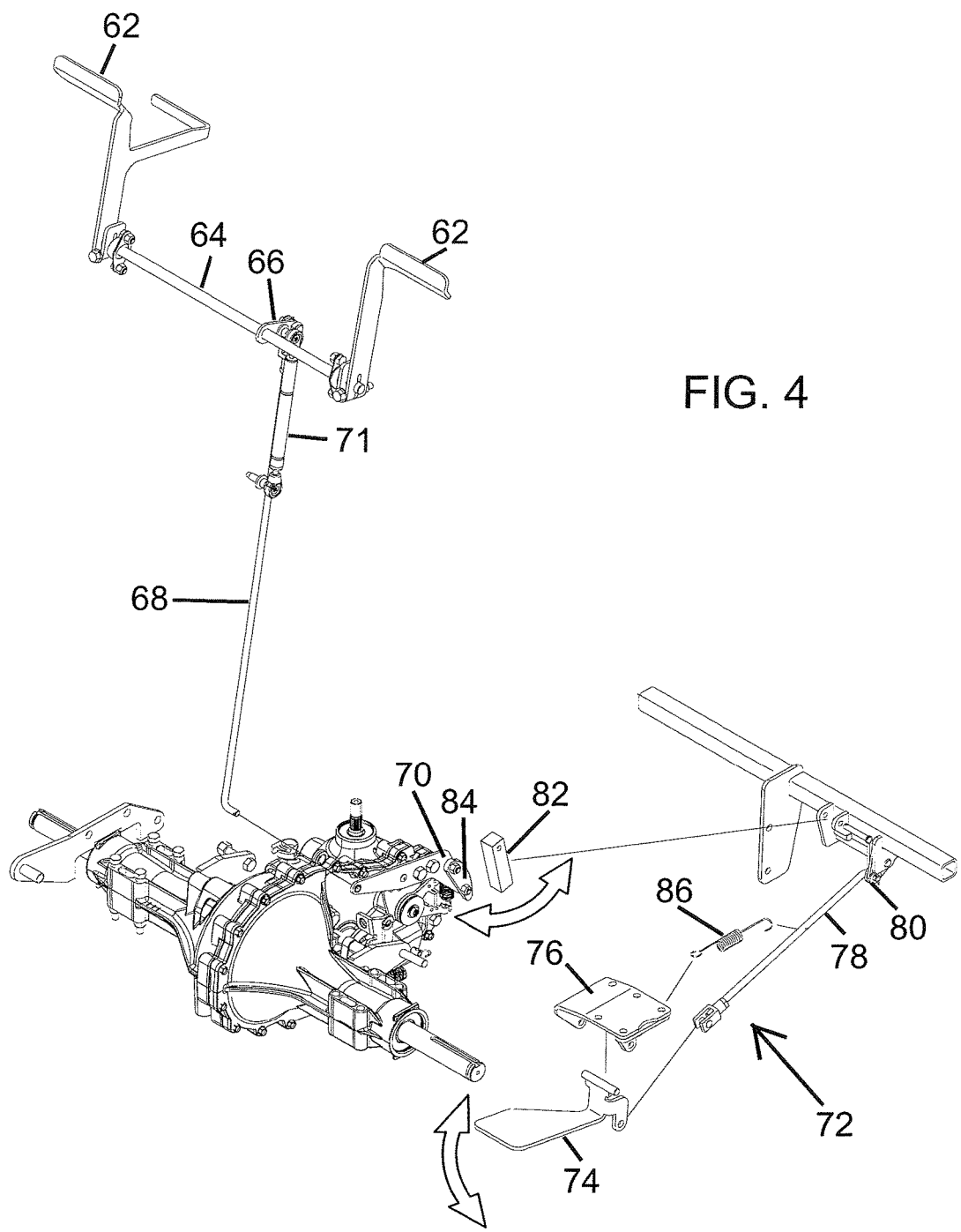
FIG. 4 shows an exploded, perspective view of the rear axle assembly of the product applying apparatus of FIG. 1.
Figure 4A:
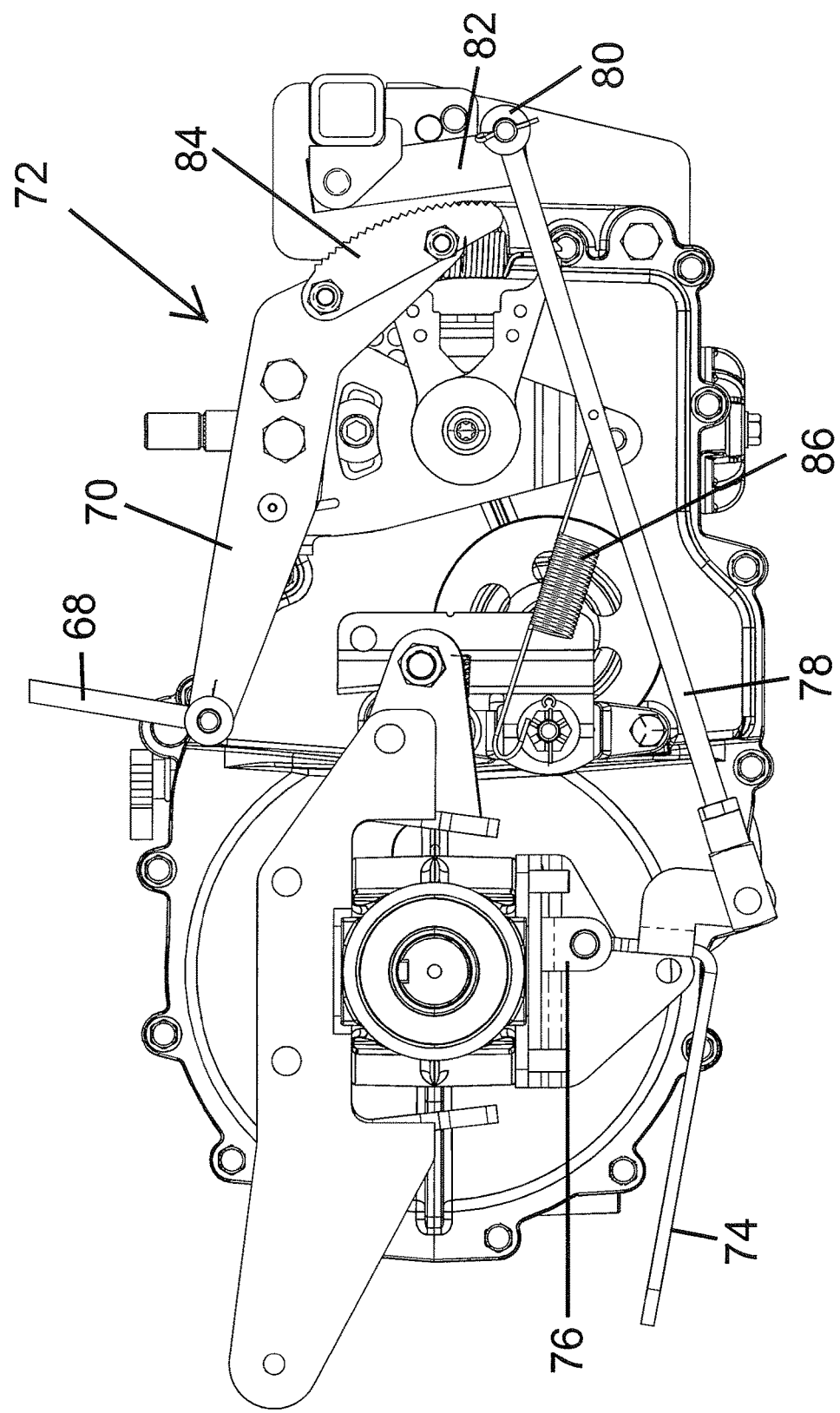
FIGS. 4A and 4B show perspective and partial, cross sectional views, respectively, of the rear axle assembly of FIG. 4.
Figure 4B:
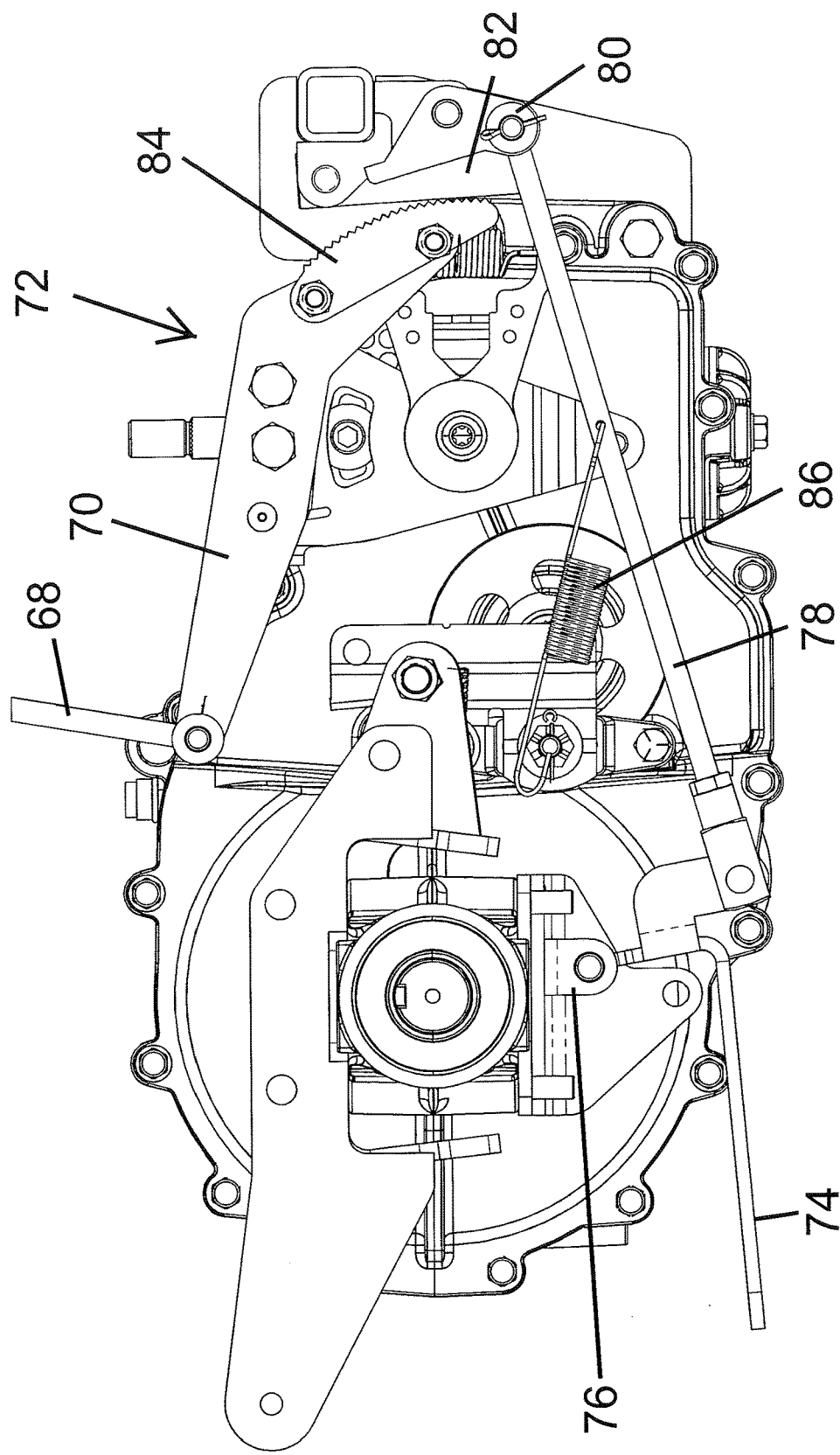
Figure 5:
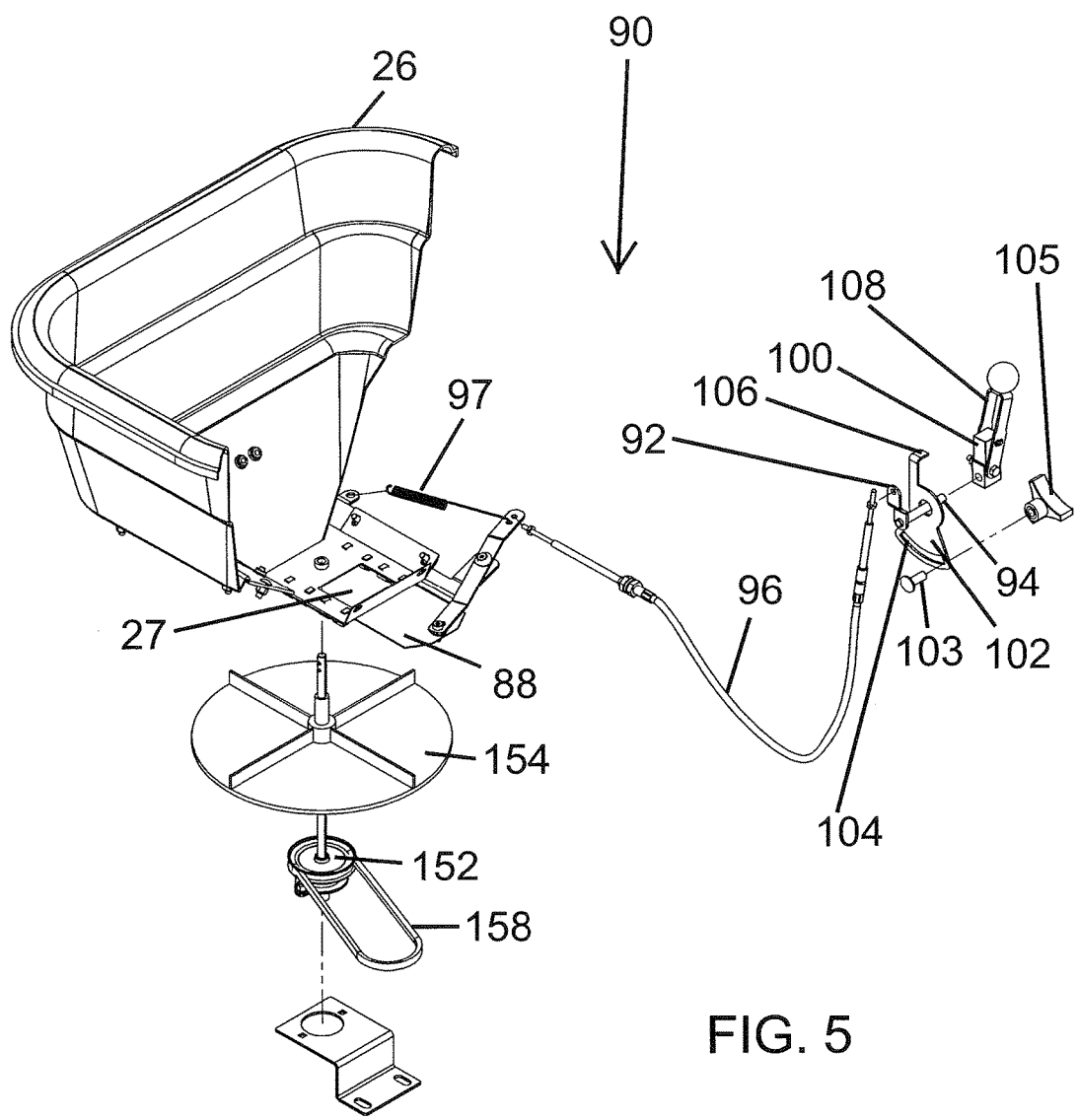
FIG. 5 shows a partial, cross sectional view of the hopper assembly of the product applying apparatus of FIG. 1 with the gate in a fully open position.
Figure 5A:
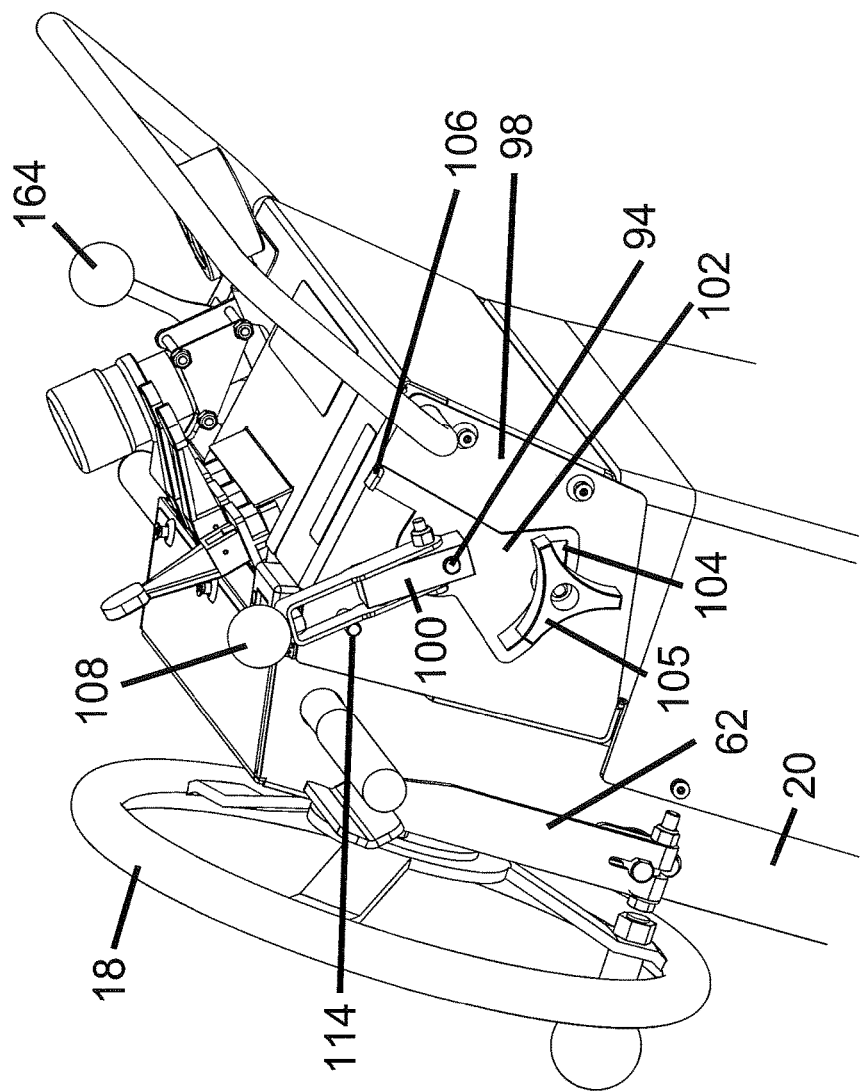
Figure 5E:
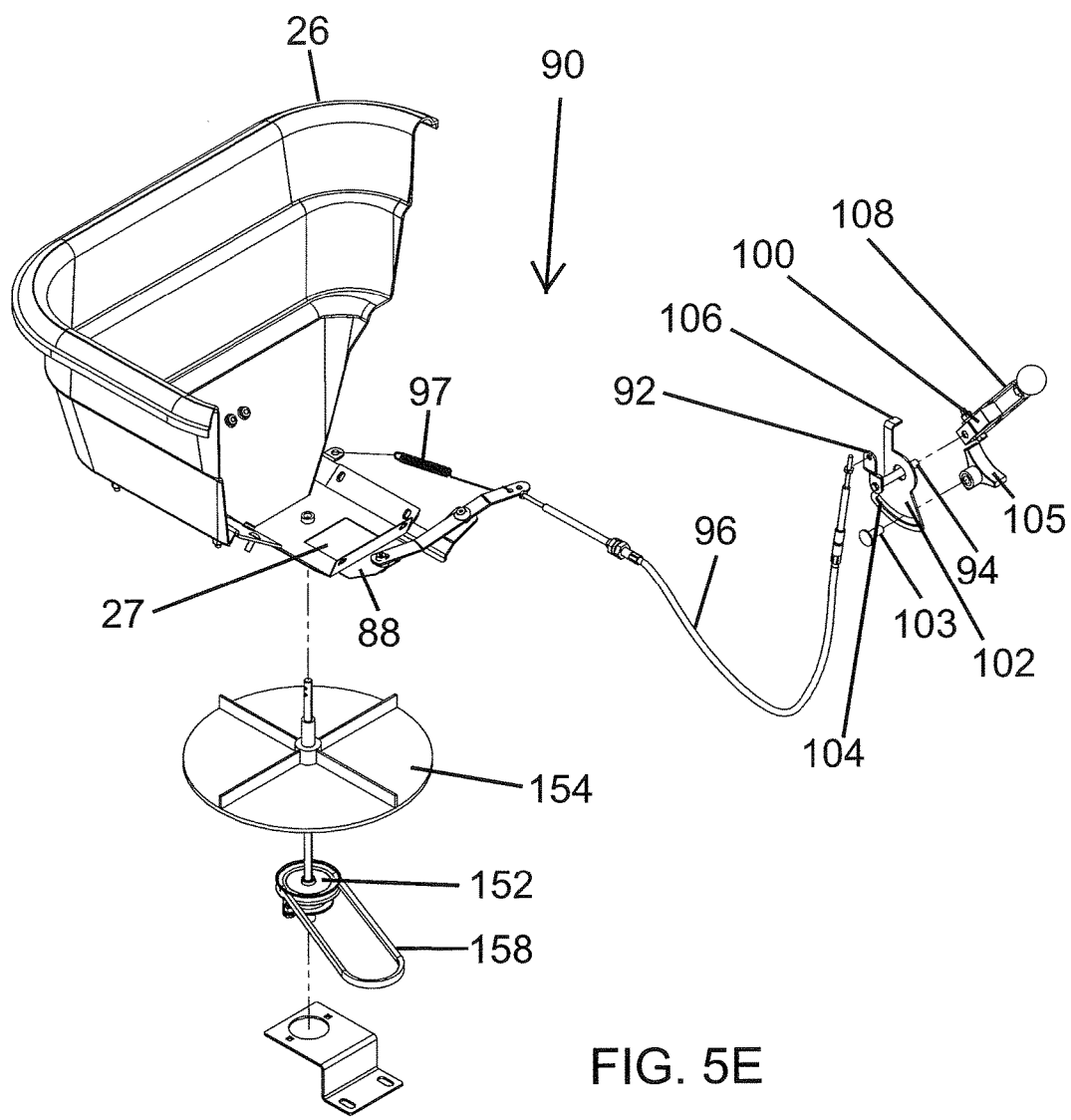
FIG. 5E shows a partial, cross sectional view of the hopper assembly of the product applying apparatus of FIG. 1 with the gate in a closed position.
Figure 6:
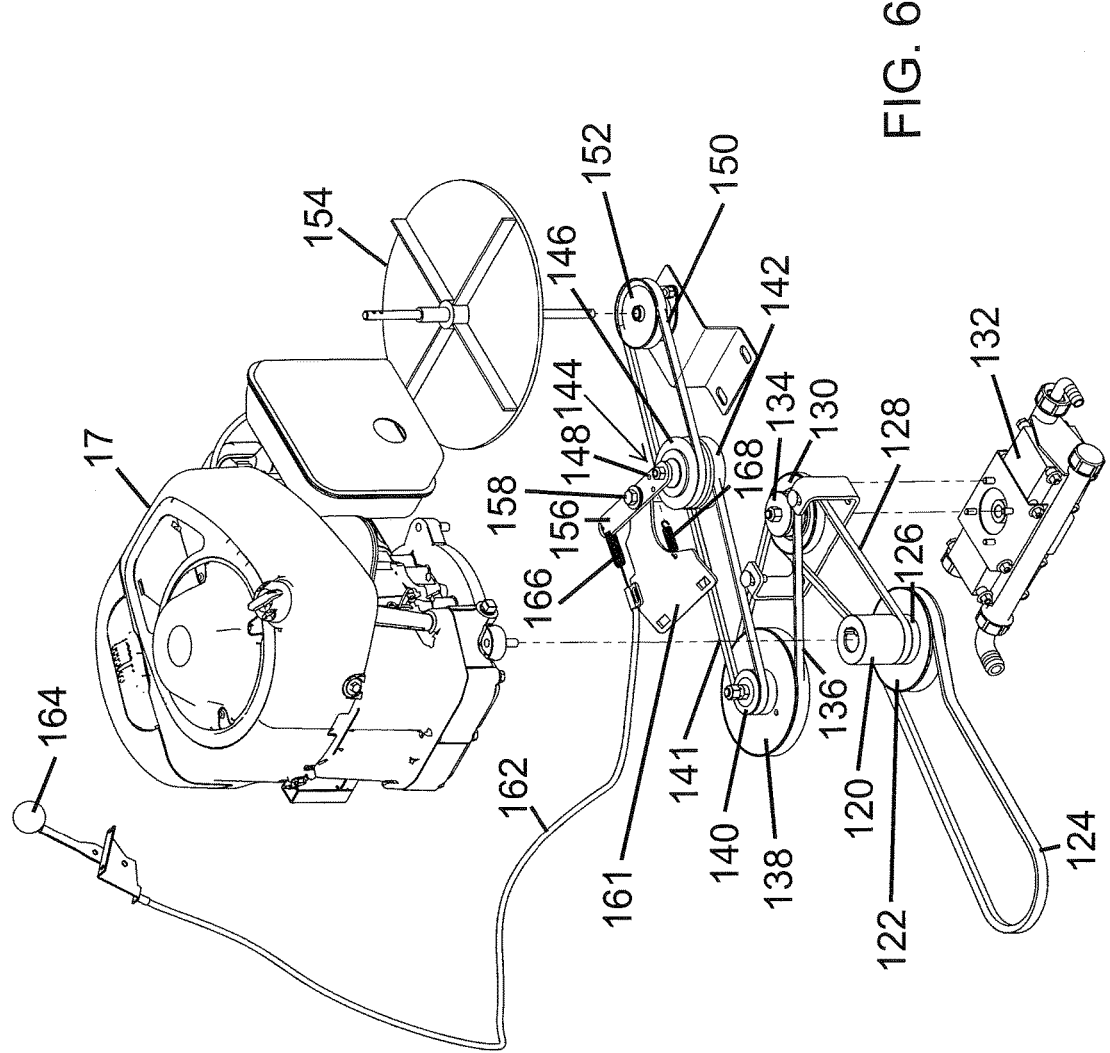
FIG. 6 shows a perspective view of the spinner drive system of the product applying apparatus of FIG. 1.
Figure 6A:
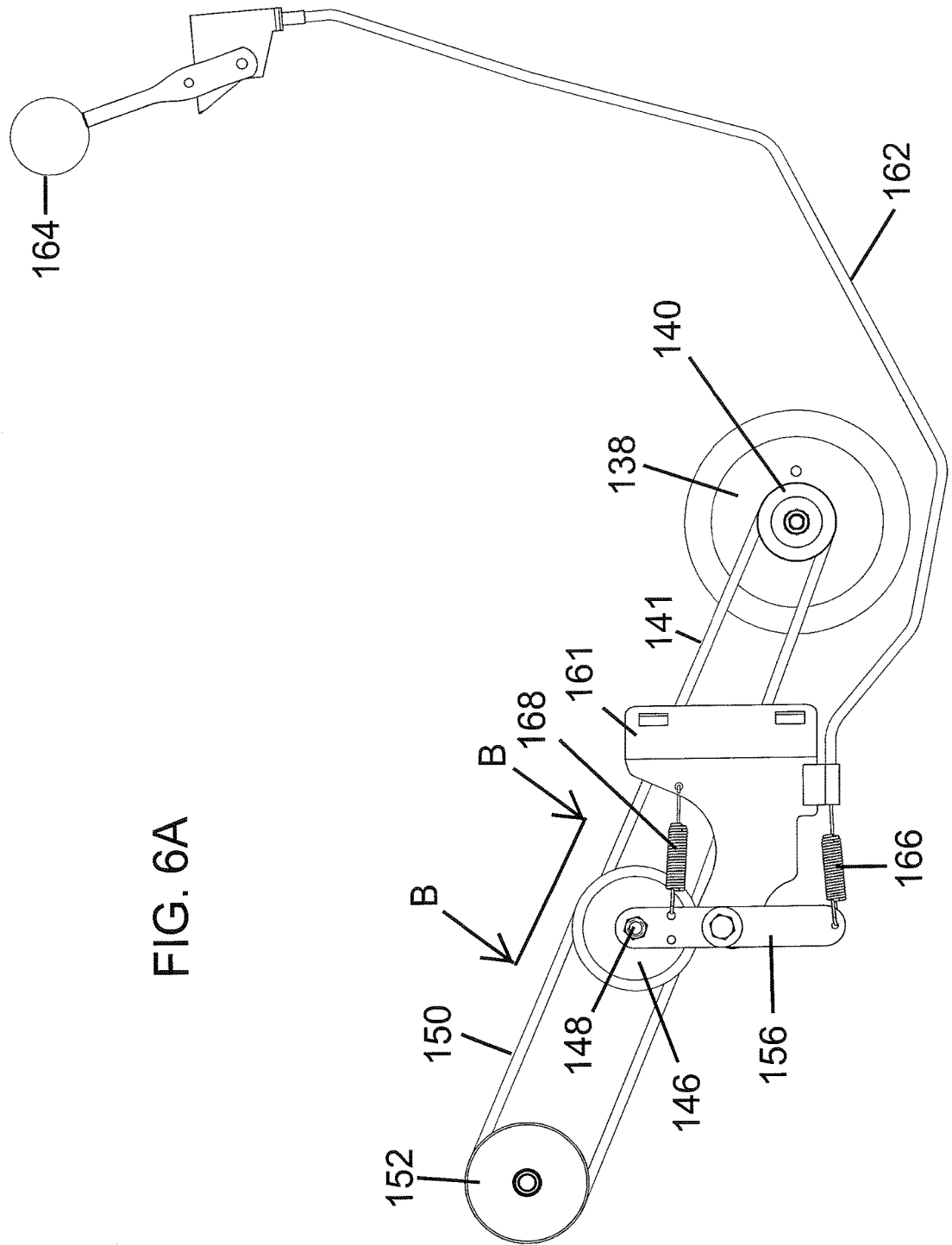
Figure 6B:
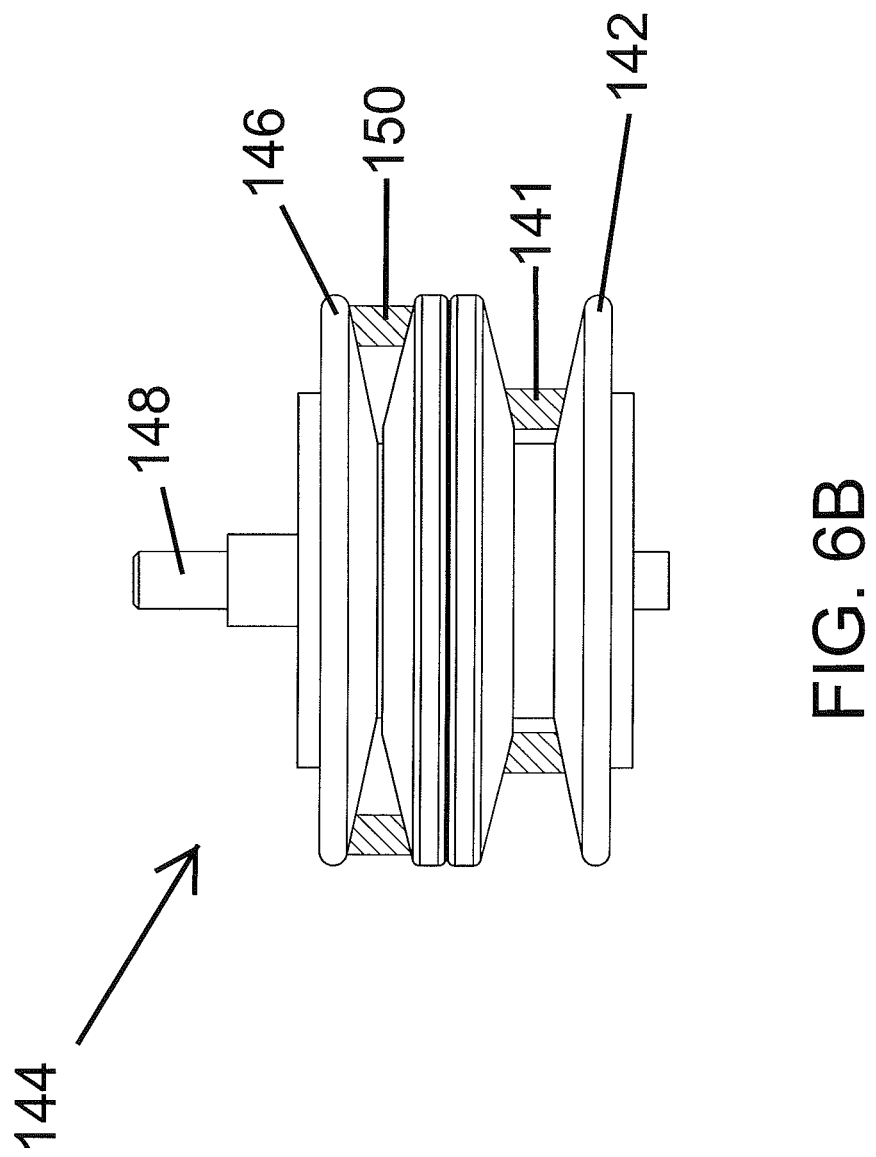
Figure 6C:
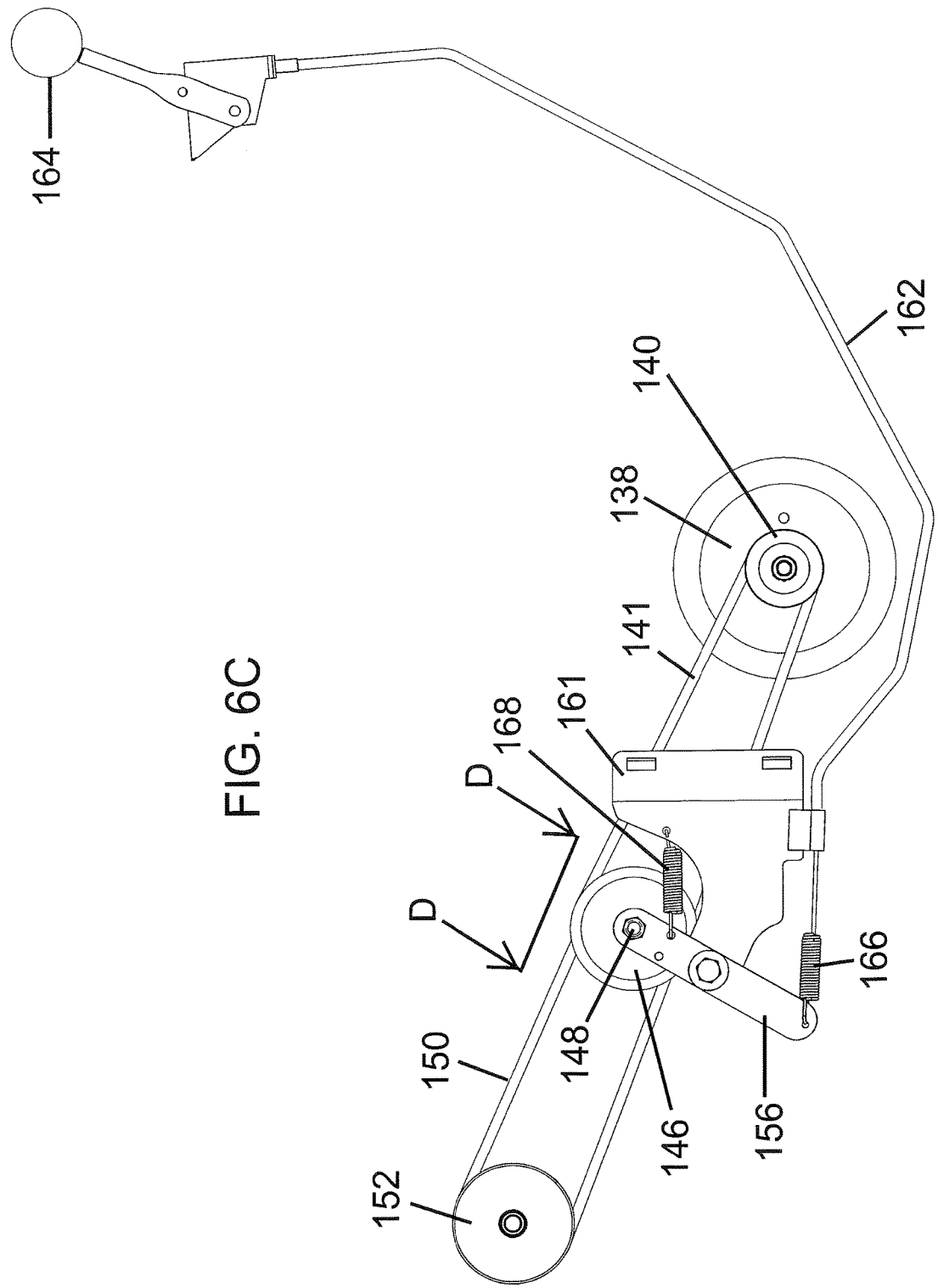
Figure 7A:
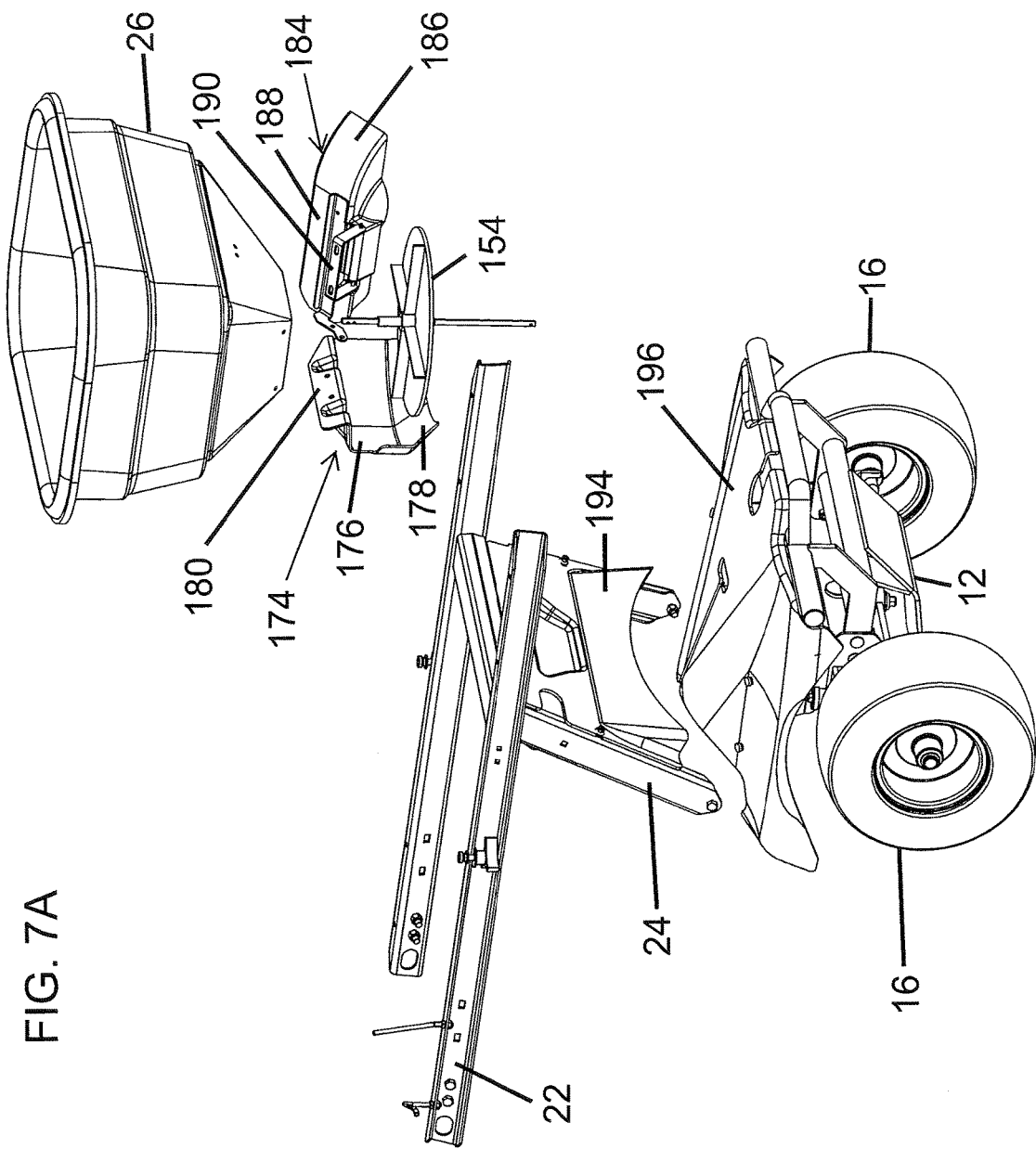
FIGS. 7A and 7B show exploded, perspective views of the spinner shielding of the product applying apparatus of FIG. 1 in differing positions.
Figure 7B:
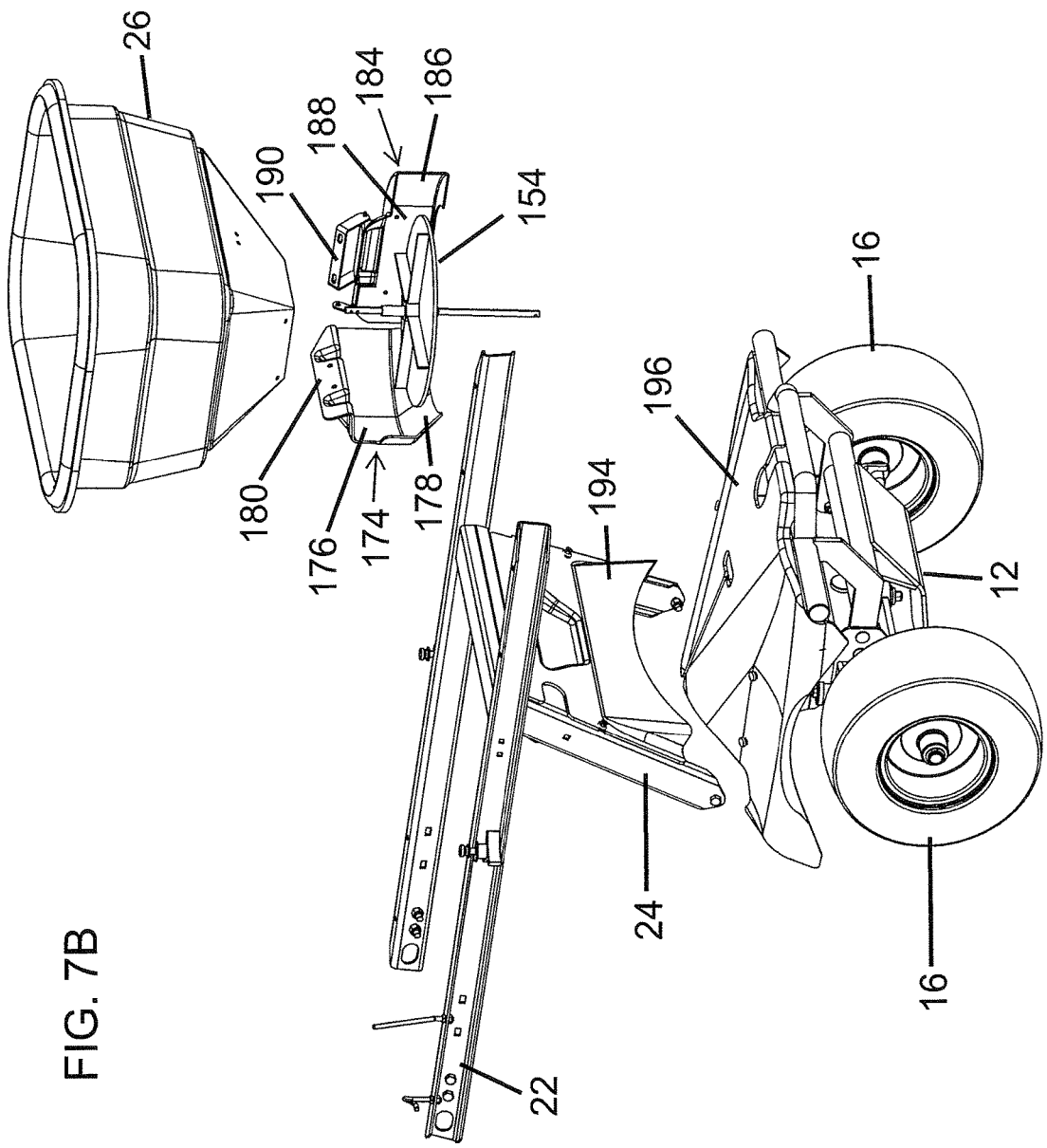
Figure 7C:
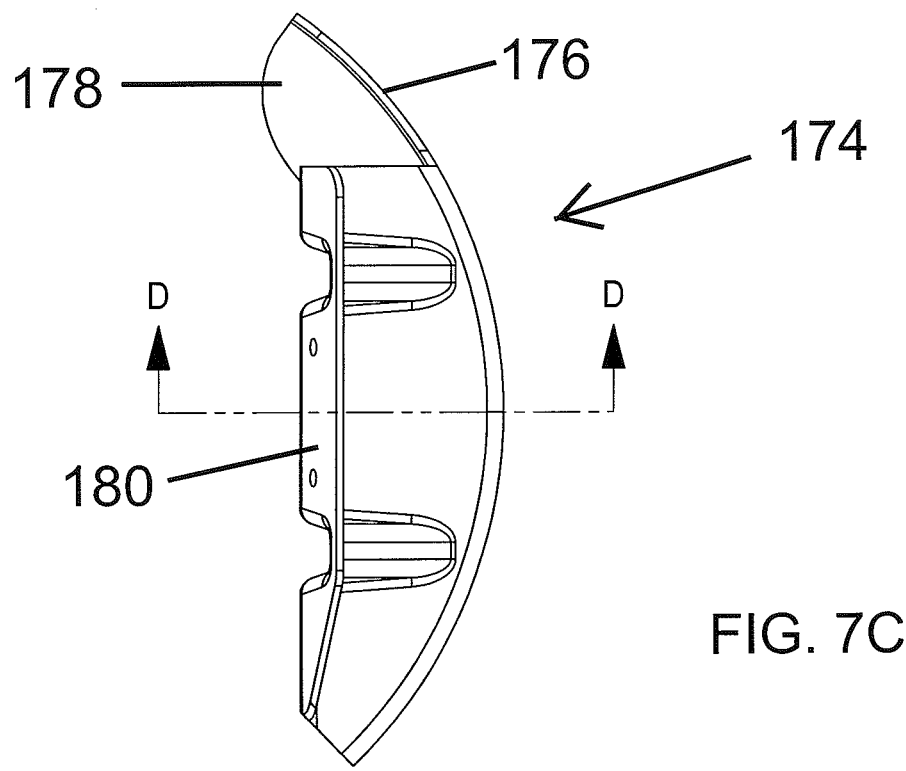
FIG. 7C shows a top view of the primary shield of the spinner shielding of FIGS. 7A and 7B.
Figure 7D:
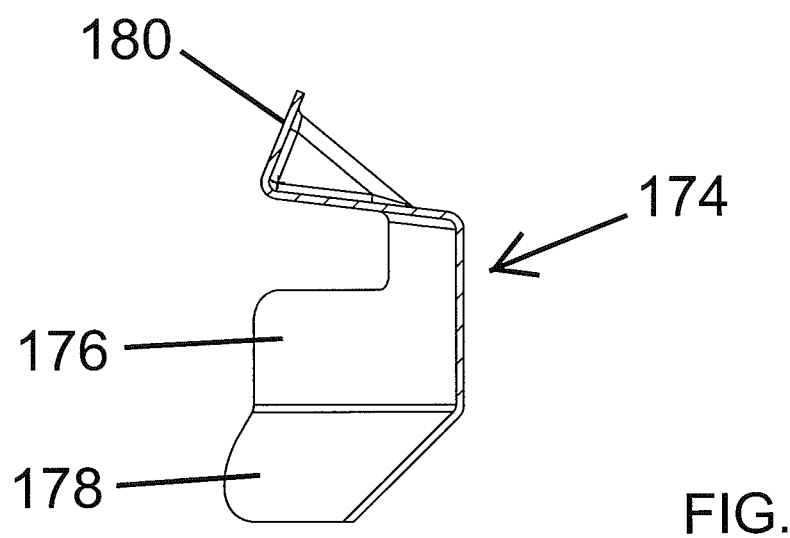
FIG. 7D shows a cross sectional view of the primary shield of FIG. 7C according to section line D-D of FIG. 7C.
Figure 7E:
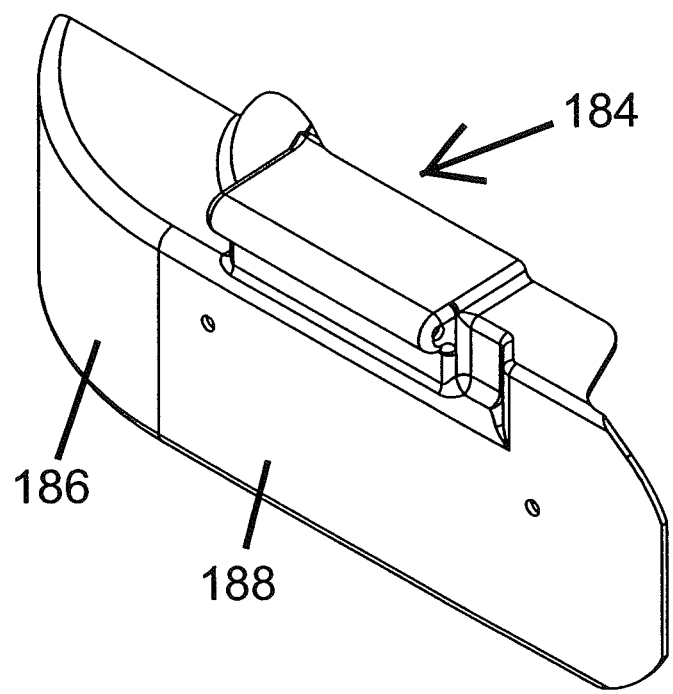
FIG. 7E shows a perspective view of the flip shield of the spinner shielding of FIGS. 7A and 7B.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for applying product to areas utilizing methods according to the preferred teachings of the present invention is shown in the drawings and generally designated 10. In the preferred form, product to be applied are in granular form such as fertilizer, insecticide, herbicide, salt and the like or in liquid form such as fertilizer, insecticide, herbicide, and the like. The product is applied upon areas upon which apparatus 10 is moveably supported and in the most preferred form is turf such as lawns, golf courses, or the like but could include, but not limited to, sidewalks, parking lots, and the like.

In the most preferred form, apparatus 10 includes a lower frame assembly 12 including a pair of driven wheels 14 adjacent the rear thereof and a pair of steerable front wheels 16 adjacent the front thereof. In the preferred form shown, an engine 17 such as a gasoline engine is mounted to lower frame assembly 12 generally intermediate wheels 14 and 16, with engine 17 suitably connected to wheels 14 for driving thereof. A steering wheel 18 is rotatably mounted to columns 20 connected to lower frame assembly 12 at an inclined angle slightly less that 90° towards the front thereof. In the preferred form, steering wheel 18 is rotatably mounted about an axis extending generally perpendicular to columns 20 and generally horizontally at an inclined angle corresponding to the inclined angle of columns 20. Steering wheel 18 is suitably operatively connected to steerable front wheels 14 by any suitable manner.

In the preferred form shown, a pair of upper frame rails 22 extends generally parallel to lower frame assembly 12. Particularly, frame rails 22 are interconnected to columns 20 and are supported by a brace 24 extending from lower frame assembly 12 at an angle corresponding to the inclined angle of columns 20. A hopper 26 is mounted to rails 22 opposite to columns 20 and includes a lower opening 27. A support tray 28 is mounted between rails 22 intermediate hopper 26 and columns 20. First and second saddle tanks 30 are mounted to rails 22 and include arcuate lower surfaces 32 extending over and in front of rear wheels 14 and below tray 28.

According to the preferred teachings of the present invention, apparatus 10 includes an operative support device including a floating platform 34. Specifically, platform 34 is generally U-shaped in cross section and includes first and second trapezoid sides 36 extending generally perpendicularly from opposite ends of a support 38. In the most preferred form, support 38 includes a rubber mat 40 suitably connected thereto. Platform 34 in the preferred form is pivotably mounted about an axis extending parallel to and spaced from support 38 and generally perpendicular to the movement direction of the vehicular portion of apparatus 10, such as by pivot brackets 42 suitably secured to the axle assembly for wheels 14, to lower frame assembly 12, and/or to columns 20 of the vehicular portion of apparatus 10 by any suitable manner. Sides 36 are suitably pivotably connected to brackets 42 by pivot assemblies 44. Although the preferred form shown is believed to produce synergistic results, it should be appreciated that platform 34 could be pivotably mounted in other manners. In the most preferred form, platform 34 is pivotal between an operable position where support 38 and mat 40 are generally horizontal and parallel to lower frame assembly 12 and a transport position where support 38 abuts with columns 20 and spaced from support 38 in the transport position. In the most preferred form, due to inclined angle of columns 20, support 38 and mat 40 are generally slightly past vertical so that it does not have a tendency to unintentionally pivot from the transport position to the operable position.

According to the preferred teachings of the present invention, platform 34 includes provisions for eliminating vibrations to an operator standing upon support 38 to reduce fatigue. Particularly, in addition to mat 40, bushings 46 are suitably provided extending between and abutting platform 34 and the vehicular portion of apparatus 10 when platform 34 is in its operable position and in a direction non parallel to and spaced from the axis of pivot assemblies 44. Bushings 46 are formed of compressible material and in the most preferred form of rubber. In the most preferred form, bushings 46 are mounted to platform 34 and removably abut with the axle assembly for wheels 14, to lower frame assembly 12, to columns 20 and/or other locations of the vehicular portion of apparatus 10. Particularly, in the preferred form shown, mounting plates 48 extend generally perpendicular from sides 36 generally perpendicularly to support 38. Bushings 46 each include a threaded shaft extending therefrom and extending through and suitably secured to mounting plates 48 such as by nuts.

Furthermore, in the most preferred form, pivot assemblies 44 each includes a collar 52 integrally extending from side 36 generally concentrically to the axis of pivot assemblies 44. Each collar 52 receives a bushing 54 formed of compressible material such as rubber. A pivot pin 56 extends through a sleeve 50 extending through bushings 54 and generally concentrically to the axis of pivot assemblies 44 and collar 52. Pivot pins 56 extend through brackets 42 and are suitably connected thereto such as by nuts.

It should be appreciated that platform 34 is solely supported by the vehicular portion of apparatus 10 through bushings 46 and 54. Due to the compressible material forming bushings 46 and 54, any vibrations caused by operation of engine 17 or other portions of apparatus 10, caused by wheels 14 and 16 moving upon the application area, or caused by other factors are absorbed by the compression of the material forming bushings 46 and 54 to minimize or eliminate transmission to platform 34 and/or the operator standing thereon according to the preferred teachings of the present invention.

Furthermore, platform 34 can be easily pivoted to the transport position by pivoting platform 34 about pivot assemblies 44 without requiring removal of any interconnections to vehicular portion of apparatus 10. As an example, an operator's foot can be placed under support 38 and raised to pivot platform 34 from its operable position to its transport position. It should be appreciated that the overall machine length is less when platform 34 is in its transport position than when in its operable position to allow apparatus 10 to take less space for transport such as in a pick-up truck, trailer, or van, or during storage when not in use.

According to the preferred teachings of the present invention, the ground speed of apparatus 10 is controlled by pivotal levers 62 located on opposite sides of steering wheel 18. Specifically, in the preferred form, levers 62 extend generally perpendicular to a speed shaft 64 pivotably mounted relative to columns 20. A crank arm 66 extends radially to shaft 64 and is pivotably connected to a linkage 68 in turn pivotably connected to a proportioner arm 70 of the transmission driving wheels 14. In the preferred form, a gas spring or cylinder 71 is pivotably connected to crank arm 66 spaced from and generally parallel to linkage 68 for dampening movement of proportioner arm 70 and pivot levers 92 to the neutral position in a predetermined time under the bias of a spring inside the transmission driving wheels 14. Thus, by moving levers 62 with the hands of the operator, proportioner arm 70 is moved to control the ground speed of apparatus 10.

According to the preferred teachings of the present invention, a ground speed lock 72 utilizes the operator's body weight to activate and secure the proper force to keep apparatus 10 in motion. In particular, lock 72 includes a pedal step 74 pivotably mounted to a mounting bracket 76 mounted to the axle assembly for wheels 14, lower frame assembly 12, columns 20 and/or another location of the vehicular portion of apparatus 10. Step 74 is pivotably connected by a linkage 78 to pivotal cam 80 pivotably mounted to lower frame assembly 12 and/or another portion of the vehicular portion of apparatus 10. A composite block 82 is connected to and moveable with cam 80. An engagement 84 is connected to and moveable with proportioner arm 70 and is shown in the preferred form as a serrated element. Step 74 and cam 80 are biased to an unlocked position from a locked position such as by a spring 86 extending between linkage 78 to bracket 76. In the unlocked position, block 82 and engagement 84 are in a non interfering relation. In the locking position, block 82 engages with engagement 84 and stops movement of proportioner arm 70.

In operation of apparatus 10 of the most preferred form, the operator stands upon platform 34, with pivotal levers 62 initially being in their neutral position. The operator then pivots one of the levers 62 from its neutral position with one hand while the other hand is engaged with steering wheel 18. Thus, apparatus 10 will move upon the application area at a speed according to the movement of levers 62 from their neutral position. If the operator removes his hands from levers 62, levers 62 will pivot to their neutral position under bias dampened by gas cylinder 71. In the event that the operator wants to maintain the speed of apparatus 10 but wishes to remove his hands from levers 62, the operator places his foot upon and pivots step 74 from its unlocked position to its locked position. Pivoting of step 74 causes composite block 82 to pivot into engagement 84 to lock proportioner arm 70 in position and to prevent movement thereof. With the proportioner arm 70 locked, the operator can let go of levers 62 so that the operator's hands can be utilized in other locations and functions. To stop movement of apparatus 10, the operator moves his foot relative to step 74 which then moves under the bias of spring 86 from its locked position to its unlocked position. In the unlocked position, composite block 82 is not operationally engaged with engagement 84 so that proportioner arm 70 can move under bias dampened by gas cylinder 71 to its neutral position. Similarly, if the operator should intentionally or unintentionally step from platform 34, the operator's foot would be removed from step 74 so that it would pivot into its unlocked position and thereby allowing proportioner arm 70 to move to its neutral position according to the preferred teachings of the present invention.

Apparatus 10 includes a moveable gate 88 which opens or closes lower opening 27 in hopper 26. It can be appreciated that when moveable gate 88 is open, product contained in hopper 26 is permitted to pass through lower opening 27 and to exit hopper 26. It should further be appreciated that lower opening 27 and moveable gate 88 can be a variety of forms and types according to the teachings of the present invention.

Figure 8A:
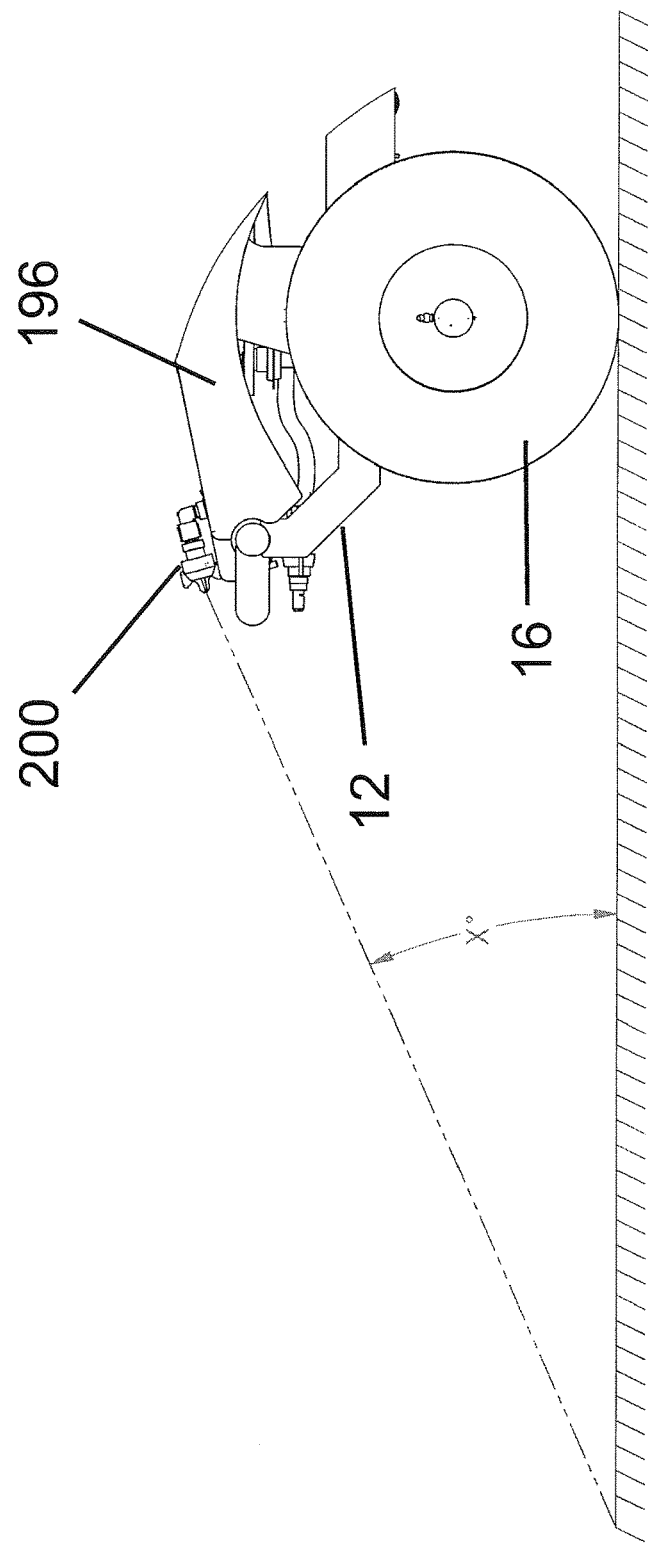
FIG. 8A shows a partial side view of the product applying apparatus of FIG. 1.
Figure 8B:
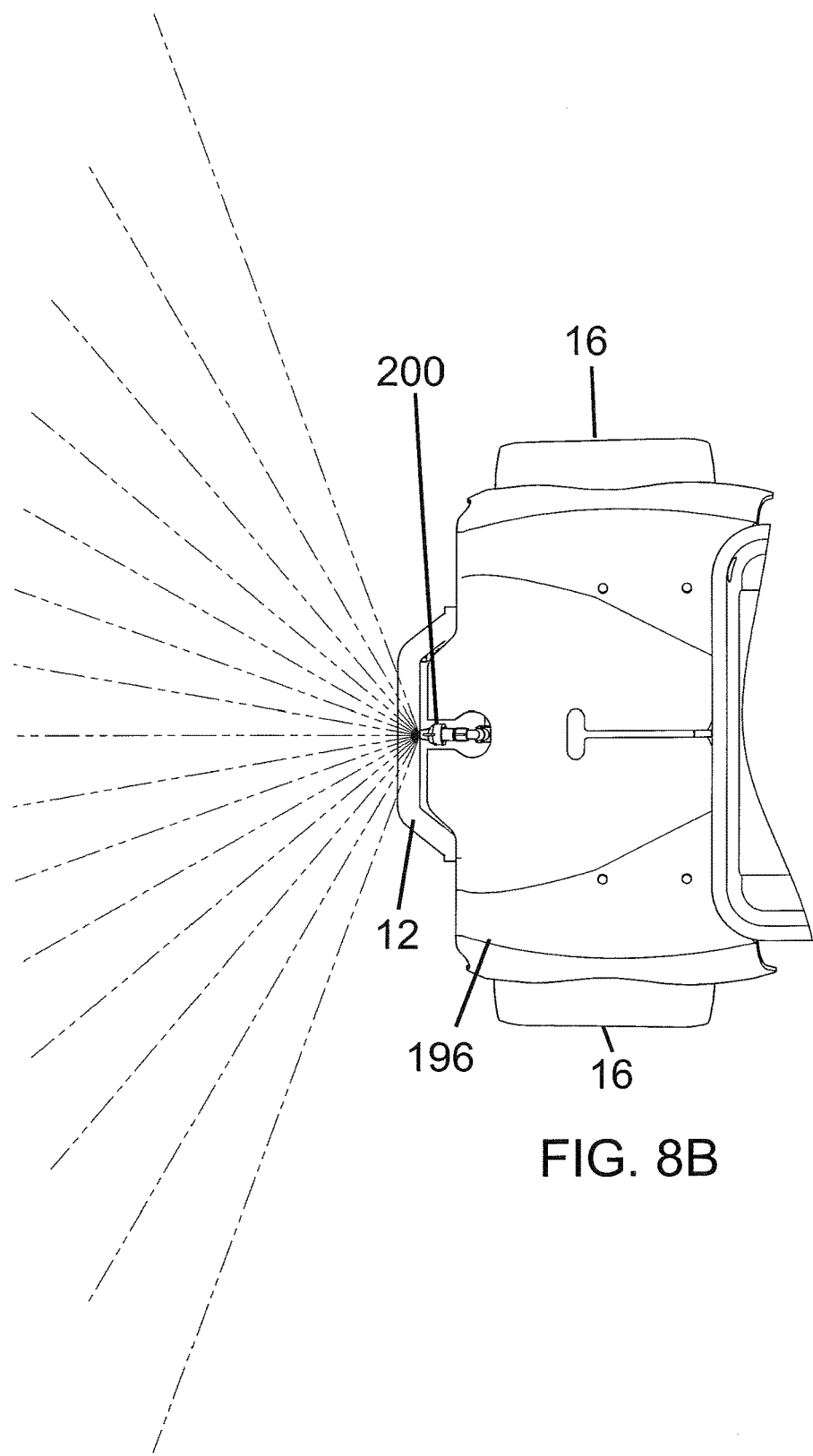
FIG. 8B shows a partial top view of the fan style, spray tip of the product applying apparatus of FIG. 8A.

According to the preferred teachings of the present invention, a gate control 90 moves moveable gate 88. Specifically, a crank arm 92 is connected to and pivotal with a pivot pin 94 and is connected to a control cable 96 for moveable gate 88, with moveable gate 88 being biased into its open position such as by a spring 97. In the most preferred form, crank arm 92 and cable 96 are located inside an enclosure panel 98, with the pivot pin 94 being pivotal relative to enclosure panel 98. A control block 100 is connected to and pivotal with pivot pin 94 on the opposite side of panel 98 than crank arm 92 and in a rotatable path. Control block 100 is pivotal relative to an adjustment guide 102 which in the preferred form is adjustably positioned relative to panel 98. Particularly, adjustment guide 102 is pivotably mounted upon pivot pin 94 and located intermediate block 100 and panel 98 in the preferred form shown. Adjustment guide 102 is adjustably fixed relative to panel 98 such as by an arcuate groove 104 formed in guide 102 concentric to and spaced from pivot pin 94. A bolt 103 extends through panel 98 and through arcuate groove 104 and includes a knob 105 threadably secured thereto. Thus, knob 105 can be tightened to sandwich guide 102 against panel 98 or can be loosened to allow pivotal movement of adjustment guide 102 relative to panel 98. Adjustment guide 102 includes a tang 106 spaced from pivot pin 94 and located outwardly of block 100. A control lever 108 is pivotably mounted to block 100 about an axis spaced from and perpendicular to pivot pin 94. In its most preferred form, control lever 108 is pivotal between a bumping position generally parallel to panel 98 and an angled position at an acute angle to panel 98. In the most preferred form, control lever 108 is removeably held in its bumping or angled position such as by a bolt 110 threaded into block 100 and extending through a FIG. 8 shaped groove 112 so that bolt 110 acts like a detent and groove 112 acts as two recesses which alternately receive the detent. In the most preferred form, panel 98 includes an abutment 114 for abutting with lever 108 and at an angular spacing relative to pivot pin 94 from tang 106 and on opposite sides of the vertical center than tang 106.

For purposes of explanation, it will be assumed that lever 108 is abutting with abutment 114, and, thus, gate 88 is in its closed position. Due to lever 108 being over center, spring 97 biasing gate 88 is unable to move lever 108 away from abutment 114. When an operator desires to open gate 88 to disperse product through opening 27 of hopper 26, the operator simply pushes lever 108 to pivot about pivot pin 94. It should then be appreciated that once lever 108 reaches its center position, spring 97 biasing gate 88 will move lever 108 away from abutment 114. If control lever 108 is in its angled position such that tang 106 does not interfere with control lever 108, lever 108 will be outside of and will pivot past tang 106 until gate 88 is in its full open position. On the other hand, if control lever 108 is in its abutting position, lever 108 will abut against tang 106 and stop gate 88 from reaching its full open position. It should be appreciated that the extent that gate 88 is open depends upon the angular position of adjustment guide 102 about pivot pin 94 and can be adjusted by loosening and then tightening knob 105 in the preferred form. It can then be appreciated that gate 88 will open to the same position consistently every time after being closed as gate 88 will open to the same extent under the bias of spring 97 until control lever 108 in its bumping position abuts with tang 106. To close gate 88, the operator pivots lever 108 about pivot pin 94 to abut with abutment 114 and thereby close gate 88 for the opening of hopper 26.

According to the preferred teachings of the present invention, apparatus 10 includes a belt drive system including a rotatable sleeve 120 which receives the drive shaft of engine 17. Rotatable with sleeve 120 is a first pulley 122 for a belt 124 connected to the transmission for driven wheels 14 and a second pulley 126 for a belt 128 connected to a pulley 130 rotatable with the input of a fluid pump 132. A pulley 134 is rotatable with pulley 130 for a belt 136 connected to an idle pulley 138. A pulley 140 is rotatable with pulley 138 and for a belt 141 connected to a first sheave 142 of a variator 144. A second sheave 146 of variator 144 is rotatable with first sheave 142 about a pivot pin 148 and for a belt 150 connected to a spinner pulley 152 removably connected to a spinner 154 located below the opening of hopper 26. It should be appreciated that when a force is applied to variator 144, the effective diameter of one of sheaves 142 and 146 increases while the effective diameter of the other of sheaves 142 and 146 decreases, thereby changing the speed of spinner pulley 152 and spinner 154 rotatable therewith, with the force being applied by moving pivot pin 148 to have different spacing with spinner pulley 152.

In the preferred form shown, pivot pin 148 is mounted to a first end of a variator arm 156 pivotal about a pivot axis 158 of a mounting bracket 161 suitably fixed to lower frame assembly 12 or another location of the vehicular portion of apparatus 10. A flexible cable 162 is connected to an end of variator arm 156 opposite to pivot pin 148 and to a control lever 164 adjacent to steering wheel 18. In the most preferred form, cable 162 is connected to variator arm 156 via a spring 166. Further, variator arm 156 is biased to move pivot pin 148 away from spinner pulley 152 such as by a spring 168 extending between mounting bracket 161 and variator arm 156. When pivot pin 148 is closer to spinner pulley 152, sheave 142 has a lesser effective diameter and sheave 146 has a greater effective diameter than when pivot pin 148 is further from spinner pulley 152.

In the preferred form, if control lever 164 is pushed away from the operator, cable 162 is shortened to move variator arm 156 such that pivot pin 148 moves toward spinner pulley 152 and spinner 154 rotates at a faster speed. On the other hand, if control lever 164 is pulled toward the operator, cable 162 is lengthened to move variator arm 156 such that pivot pin 148 moves away from spinner pulley 152 and spinner 156 rotates at a slower speed.

It should be appreciated that unless belts 141 and 150 are in motion, it may not be possible to shift variator arm 156. Spring 166 allows the operator to pivot control lever 164 even while belts 141 and 150 are not in motion and without damage to components of apparatus 10. As soon as belts 141 and 150 start to move, variator arm 156 will pivot corresponding to the location of control lever 164. Spring 168 balances spring 166 in the most preferred form. Thus, the belt drive system according to the preferred teachings of the present invention is a totally mechanical system that allows the operator to easily change the rotational speed of spinner 154.

Apparatus 10 according to the preferred teachings of the present invention further includes shielding for spinner 154. In the most preferred form, a primary shield 174 is located behind spinner 154 in the movement direction and includes an arcuate portion 176 extending concentrically to and spaced from spinner 154 for a portion of the outer circumference of spinner 154 and, in the preferred form, approximately 90°. A lip 178 extends at an angle in the order of 45° from the lower edge of arcuate portion 176. Primarily shield 174 is suitably fixed to the vehicular portion of apparatus 10 and in the most preferred form is mounted to hopper 26 such as by a bracket 180 having a generally V-shape and integrally extending from the top edge of arcuate portion 176.

In the most preferred form, a flip shield 184 is located in the rotation direction of spinner 154 and includes an arcuate portion 186 and a linearly straight portion 188 extending from arcuate portion 186. Flip shield 184 is pivotably mounted to the vehicular portion of apparatus 10 and in the most preferred form is mounted to hopper 26 such as by a pivot bracket 190. Flip shield 184 is moveable between a redirection position and an inoperative position. In the redirection position, linearly straight portion 188 abuts with and is coextensive with arcuate portion 176 of primary shield 174 and extends generally parallel to the movement direction of apparatus 10. Linearly straight portion 188 is intermediate arcuate portions 176 and 186. In the inoperative position, flip shield 184 does not interfere with product leaving spinner 154 and, in the most preferred form, is adjacent to hopper 26.

In the preferred form shown, an engine shield 194 is secured to brace 24, and a front shield 196 is secured to the frame assembly including front wheels 16. Shields 194 and 196 act as guards to protect the moving components of apparatus 10 as well as direct any product which ricochet or stray from the desired area back into the application area.

According to the preferred teachings of the present invention, apparatus 10 includes a single, fan style, spray tip 200 mounted to the vehicular portion of apparatus 10 in front of wheels 16 in the movement direction and generally parallel to the application area and in the most preferred form, at a spray angle 15 to 25 degrees from a plane parallel to the application area. Spray tip 200 is in fluid communication with a pump in fluid communication with tanks 30. In particular, fan style spray tip 200 sprays product in liquid form in the shape of a fan which has a relatively narrow thickness and an increasing width of a generally V-shaped as opposed to cone shape which has increasing width and thickness. Fan style spray tips are commonly used in agricultural applicators where they are mounted on booms elevated high in the air and directed generally straight down towards the ground. However, mounting fan style spray tip 200 to spray product forwardly and in particular generally parallel to the application area produces synergistic results in apparatus 10 according to the preferred teachings of the present invention. Specifically, fan style spray tip 200 operates under higher liquid pressure in the order of 40 psi so that the spray pattern is more consistent with large droplets which are less susceptible to droplet drift from wind. Further, fan style spray tip 200 is mounted at an elevation which is considerably closer to the application area than when similar fan style spray tips are utilized in conventional agricultural applications while still obtaining a relatively large width in the order of 9 feet with just a single fan style spray tip 200. Additionally, the application angle of fan style spray tip 200 projects the droplets at an angle to the application area which helps penetrate the canopy of turf to allow more effective use of the product being applied. Thus, apparatus 10 according to the preferred teachings of the present invention utilizing fan style spray tip 200 mounted at a minor angle to the application area provides for a simpler construction and for more effective use of the product than conventional applicators.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus 10 could be constructed according to the teachings of the present invention including such features singly or in other combinations. As an example, use of fan style spray tip 200 mounted according to the teachings of the present invention could be utilized with other types and/or forms of devices for applying product in granular form than of the preferred form shown and in apparatus 10 which does not have the capability of applying product in granular form and/or which have other functional capabilities. Similarly, fan style spray tip 200 mounted according to the teachings of the present invention could be utilized in apparatus 10 of other vehicular forms than of the preferred form shown such as including but not limited to sit-down or walk behind vehicular forms, articulated frame type vehicular forms, tricycle type vehicular forms, front wheel drive, all-wheel drive, skid type vehicular forms and the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Ground speed lock for a proportioner arm of an apparatus comprising, in combination: a step pivotally mounted between an unlocked position and a locked position, with the step being biased from the locked position to the unlocked position; a composite block moveably related to the step; and an engagement connected to and moveable with the proportioner arm, with the composite block engaging with the engagement when the step is in the locked position preventing relative movement of the composite block and the engagement, with the composite block being in a non interfering relation with the engagement when the step is in the unlocked position permitting relative movement of the composite block and the engagement.

2. The ground speed lock of claim 1 further comprising, in combination:

a step linkage pivotally connected to the step; a pivotally mounted cam, with the composite block moveable with the pivotally mounted cam, with the pivotally mounted cam pivotably connected to the step linkage; and a spring connected to the step linkage biasing the step, with the engagement being a serrated element.

3. The ground speed lock of claim 2 further comprising, in combination:

at least one pivotal hand lever pivotal about a pivot axis from a neutral position to a movement position; a crank arm extending radially from the pivot axis; a lever linkage pivotably connected to the crank arm and to the proportioner arm, with the pivotal hand lever being biased from the movement position to the neutral position.

* * * * *